United States Patent
Ryu

(10) Patent No.: US 12,147,356 B2
(45) Date of Patent: *Nov. 19, 2024

(54) STORAGE DEVICE ADAPTIVELY SUPPORTING PLURALITY OF PROTOCOLS

(71) Applicant: SAMSUNG ELECTRONICS CO., LTD., Suwon-si (KR)

(72) Inventor: Suengchul Ryu, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,971

(22) Filed: Sep. 27, 2021

(65) Prior Publication Data
US 2022/0012192 A1    Jan. 13, 2022

Related U.S. Application Data

(63) Continuation of application No. 16/510,050, filed on Jul. 12, 2019, now Pat. No. 11,132,309.

(30) Foreign Application Priority Data

Nov. 5, 2018    (KR) .................. 10-2018-0134232

(51) Int. Cl.
*G06F 13/12*    (2006.01)
*G06F 13/16*    (2006.01)

(52) U.S. Cl.
CPC ................ *G06F 13/1668* (2013.01)

(58) Field of Classification Search
CPC .................................... G06F 13/1668
USPC ................................................. 710/5
See application file for complete search history.

(56) References Cited

U.S. PATENT DOCUMENTS

| | | | | |
|---|---|---|---|---|
| 5,870,586 A | * | 2/1999 | Baxter | G06F 30/331 |
| | | | | 716/117 |
| 6,049,222 A | * | 4/2000 | Lawman | G06F 15/7867 |
| | | | | 326/38 |
| 6,842,034 B1 | * | 1/2005 | Chan | H03K 19/17752 |
| | | | | 326/8 |

(Continued)

FOREIGN PATENT DOCUMENTS

| CN | 105302746 | | 2/2016 |
|---|---|---|---|
| KR | 20160016753 | A | 2/2016 |
| KR | 20180009851 | A | 1/2018 |

OTHER PUBLICATIONS

Korean Examination Report dated Feb. 16, 2023 cited in Korean Patent Application.

*Primary Examiner* — Titus Wong
(74) *Attorney, Agent, or Firm* — Fish & Richardson P.C.

(57) ABSTRACT

A storage device includes a memory device and a controller. The controller includes a programmable logic device which is reconfigurable, based on requests which are received from an outside of the storage device, to adaptively support a plurality of protocols depending on the requests. As the programmable logic device is programmed to support a first protocol among the plurality of protocols based on a first request which is received from the outside of the storage device with regard to the first protocol, the programmable logic device processes the first request in compliance with the first protocol, and the controller communicates with the memory device based on the first request such that the memory device stores or outputs data corresponding to the first request.

16 Claims, 29 Drawing Sheets

(56) References Cited

U.S. PATENT DOCUMENTS

| | | | |
|---|---|---|---|
| 7,019,558 B1* | 3/2006 | Jacobson | G06F 30/34 326/38 |
| 7,071,726 B1* | 7/2006 | Chan | H03K 19/17744 326/8 |
| 7,281,082 B1* | 10/2007 | Knapp | H03K 19/17744 326/39 |
| 7,444,454 B2 | 10/2008 | Yancey et al. | |
| 7,631,107 B2 | 12/2009 | Pandya | |
| 7,733,907 B2 | 6/2010 | Sethi | |
| 7,925,794 B2 | 4/2011 | Kreiner et al. | |
| 9,286,225 B2 | 3/2016 | Mehrotra et al. | |
| 9,940,241 B1 | 4/2018 | Mehrotra et al. | |
| 9,971,519 B2 | 5/2018 | Romem et al. | |
| 10,161,993 B2* | 12/2018 | Frediani | G01R 31/2834 |
| 10,416,887 B1* | 9/2019 | Melts | G06F 3/0629 |
| 10,515,048 B2* | 12/2019 | Lee | G06F 3/0632 |
| 2002/0080771 A1* | 6/2002 | Krumel | H04L 67/12 370/352 |
| 2004/0008725 A1* | 1/2004 | McNamara | G06F 13/4291 370/395.5 |
| 2005/0044297 A1* | 2/2005 | Feng | G06F 13/4243 711/170 |
| 2006/0133386 A1* | 6/2006 | McCormack | H04L 45/302 370/395.52 |
| 2008/0304481 A1 | 12/2008 | Gurney et al. | |
| 2009/0079467 A1 | 3/2009 | Sandven et al. | |
| 2010/0017564 A1* | 1/2010 | Heo | G06F 3/061 711/E12.001 |
| 2011/0164533 A1* | 7/2011 | Krumel | H04L 9/40 370/255 |
| 2015/0189047 A1* | 7/2015 | Naaman | H04L 45/74 370/474 |
| 2017/0085472 A1* | 3/2017 | Roberts | H04L 45/04 |
| 2018/0167268 A1 | 6/2018 | Liguori et al. | |
| 2019/0138493 A1* | 5/2019 | Teh | G06F 15/7825 |
| 2019/0155767 A1* | 5/2019 | Cheong | G06F 13/1694 |

* cited by examiner

| Protocol Name | Availability | Configuration Data | Current Configuration |
|---|---|---|---|
| Protocol #1 | Yes | Yes | No |
| Protocol #2 | Yes | Yes | Yes |
| Protocol #3 | Yes | No | No |
| Protocol #4 | No | No | No |
| Empty | – | – | – |
| Empty | – | – | – |

STORAGE DEVICE ADAPTIVELY SUPPORTING PLURALITY OF PROTOCOLS

CROSS-REFERENCE TO RELATED APPLICATION

This is a Continuation of U.S. application Ser. No. 16/510,050, filed Jul. 12, 2019, and a claim of priority under 35 U.S.C. § 119 is made to Korean Patent Application No. 10-2018-0134232 filed on Nov. 5, 2018, in the Korean Intellectual Property Office, the disclosure of which is incorporated herein by reference in its entirety.

TECHNICAL FIELD

The present disclosure relates to an electronic device, and more particularly, relates to configurations and operations of a storage device which stores or outputs data in compliance with a protocol.

DESCRIPTION OF RELATED ART

Nowadays, various types of electronic devices are being used. An electronic device performs its own functions depending on operations of various electronic circuits and devices included in the electronic device. The electronic device may provide a service to a user while operating solely or while communicating with another electronic device.

A storage device is an example of electronic devices. The storage device is configured to store data in a memory device included in the storage device or output the stored data, thus providing a storage service to a user. To this end, the storage device communicates with a host in compliance with a protocol employed by the storage device.

A protocol is a communication rule defining an order of transmitting signals, a scheme of signal processing, a data format, an authentication scheme, a scheme of error processing, and/or the like. Most of electronic devices including a storage device operate while transmitting and receiving data to and from another electronic device in compliance with a given protocol. As protocols evolve to convey a large amount of data rapidly and to reduce a data error, types and kinds of protocols have become diversified.

SUMMARY

Example embodiments may provide an electronic device (e.g., a storage device) which adaptively supports a plurality of protocols depending on requests received from an outside of the electronic device. The electronic device may include a programmable logic device which is reconfigurable to support the plurality of protocols adaptively.

In some example embodiments, a storage device may include a memory device and a controller. The controller may include a programmable logic device that is reconfigurable, based on requests received from an outside of the storage device, to adaptively support a plurality of protocols depending on the requests. As the programmable logic device is programmed to support a first protocol among the plurality of protocols based on a first request which is received from the outside of the storage device with regard to the first protocol, the programmable logic device may process the first request in compliance with the first protocol, and the controller may communicate with the memory device based on the first request such that the memory device stores or outputs data corresponding to the first request.

According to example embodiments, an electronic device (e.g., a storage device) may adaptively support a protocol irrespective of a type or a kind of a protocol, and applicability of the electronic device may be improved. In addition, an additional resource may not be required to support the plurality of protocols, and thus the example embodiments may be advantageous in terms of a cost and a circuit area.

BRIEF DESCRIPTION OF THE DRAWINGS

The above and other objects and features of the present disclosure will become apparent by describing in detail example embodiments thereof with reference to the accompanying drawings.

FIG. 13 is a table for describing an example operation of a protocol manager of FIG. 4.

DETAILED DESCRIPTION

Below, some example embodiments will be described in detail and clearly with reference to the accompanying drawings such that those skilled in the art can easily implement the present disclosure.

Figure 1:
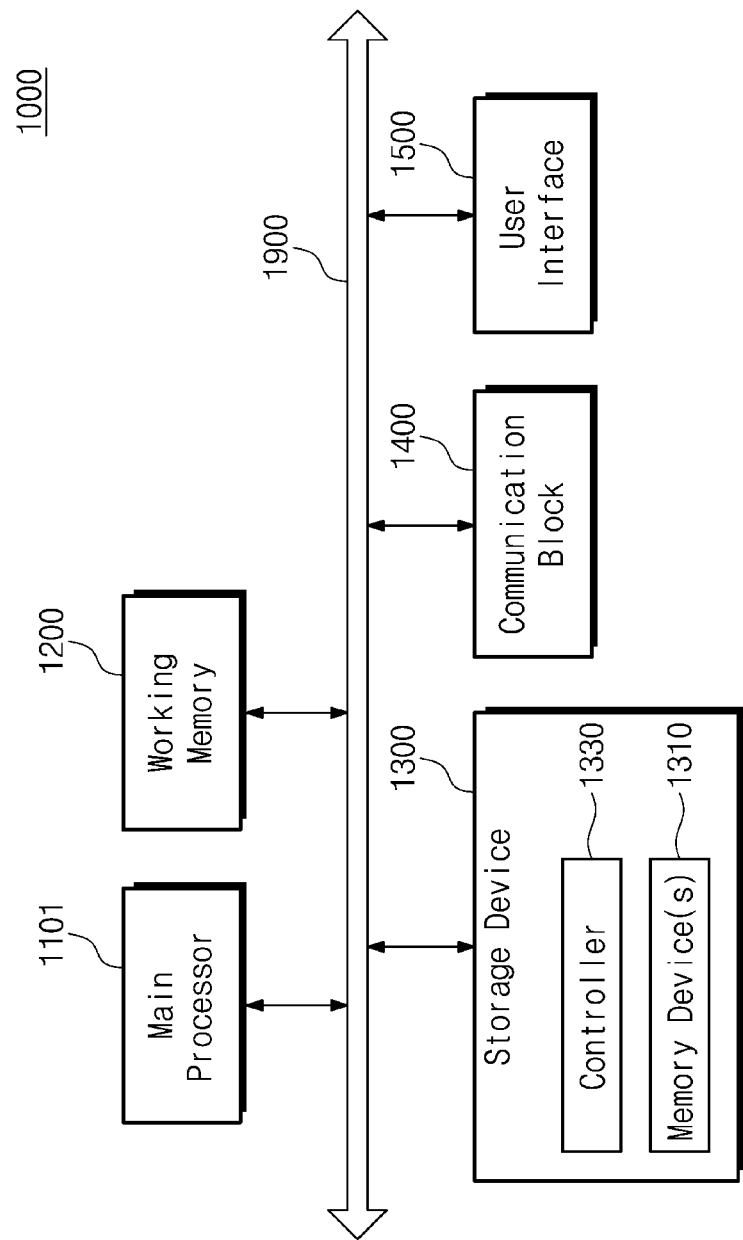
FIG. 1 is a block diagram illustrating an example configuration of an electronic system according to some example embodiments.

FIG. 1 is a block diagram illustrating an example configuration of an electronic system 1000 according to some example embodiments.

The electronic system 1000 may include a main processor 1101, a working memory 1200, a storage device 1300, a communication block 1400, a user interface 1500, and a bus 1900. For example, the electronic system 1000 may be one of electronic devices such as a desktop computer, a laptop computer, a tablet computer, a smart phone, a wearable device, a video game console, one or more servers, an electric vehicle, a home appliance, a medical device, and/or the like.

The main processor 1101 may control overall operations of the electronic system 1000. For example, the main processor 1101 may be implemented in a general-purpose processor, a special-purpose processor, or an application processor, which includes one or more processor cores.

The working memory 1200 may store data used in an operation of the electronic system 1000 (e.g., data processed or to be processed by the main processor 1101). For example, the working memory 1200 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 1300 may retain data irrespective of whether power is supplied. For example, the storage device 1300 may include a nonvolatile memory such as a flash memory, a PRAM, an MRAM, a ReRAM, or an FRAM, and may be implemented in a storage medium such as a solid-state drive (SSD), a card storage, or an embedded storage.

The communication block 1400 may communicate with an outside of the electronic system 1000. The user interface 1500 may arbitrate in communication between a user and the electronic system 1000.

The bus 1900 may provide a communication path between components of the electronic system 1000. The components of the electronic system 1000 may exchange data with one another in compliance with a bus format of the bus 1900. For example, the bus format may include one or more of various interface protocols such as universal serial bus (USB), Firewire, small computer system interface (SCSI), peripheral component interconnect express (PCIe), mobile PCIe (M-PCIe), serial advanced technology attachment (SATA), serial attached SCSI (SAS), nonvolatile memory express (NVMe), universal flash storage (UFS), double data rate (DDR), low power DDR (LPDDR), and/or the like.

The storage device 1300 may provide a storage service for a host, in response to a command or a request received from the host through the bus 1900. In the present disclosure, an object which is capable of accessing a component (such as the storage device 1300) of the electronic system 1000 may be referred to as a "host".

For example, the main processor 1101 may communicate with the storage device 1300 through the bus 1900 and the storage device 1300 may provide a storage service for the main processor 1101. The main processor 1101 may be an example of objects which may operate as a host, but another device such as the communication block 1400, the user interface 1500, a graphic processing unit (GPU), or an image sensor may also operate as a host.

For example, a host may provide the storage device 1300 with a command including a write request and data including write data. The storage device 1300 may store the requested write data in response to the write request. For example, the host may provide the storage device 1300 with a command including a read request. The storage device 1300 may output requested read data to the host in response to the read request.

The storage device 1300 may include at least one memory device 1310 and a controller 1330 to provide a storage service. The memory device 1310 may store or output data requested by a host.

The controller 1330 may control overall operations of the storage device 1300. The controller 1330 may control the memory device 1310 such that the memory device 1310 stores or outputs data. The controller 1330 may suitably process data communicated with a host (e.g., a request received from a host) in compliance with a given protocol. The controller 1330 may include one or more hardware components (e.g., an analog circuit and/or a logic circuit) configured to perform operations which are described in the present disclosure.

In some example embodiments, the controller 1330 may include one or more processor cores. Operations of the controller 1330 described in the present disclosure may be implemented with a program code of software and/or firmware, and a processor core of the controller 1330 may execute an instruction set of the program code. The processor core of the controller 1330 may process various arithmetic/logical operations to execute the instruction set.

Figure 2:
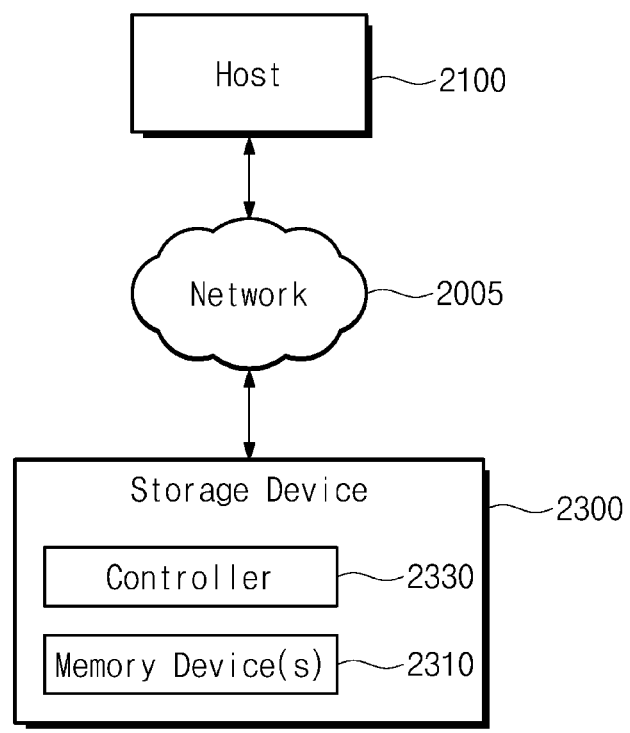
FIG. 2 is a block diagram illustrating an example configuration of a network system according to some example embodiments.

FIG. 2 is a block diagram illustrating an example configuration of a network system 2000 according to some example embodiments.

The network system 2000 may include a host 2100 and a storage device 2300. The storage device 2300 may be connected to the host 2100 through a network 2005. The present disclosure is not limited to the illustration of FIG. 2, and one or more additional components may be connected to the host 2100 and/or the storage device 2300 through the network 2005.

The host 2100 may be an object which is capable of accessing a component (such as the storage device 2300) of the network system 2000. For example, the host 2100 may be an operation processing device itself (e.g., a device such as the main processor 1101 of FIG. 1), or may be a computing device or system including an operation processing device. The storage device 2300 may correspond to the storage device 1300 of FIG. 1 and may provide a storage service for the host 2100.

The network 2005 may provide a communication path between components (e.g., the host 2100 and the storage device 2300) of the network system 2000 at a short range or a long range, in compliance with at least one of various wired protocols (e.g., Ethernet, USB, Firewire, PCIe, NVMe, SATA, and SAS) and/or various wireless protocols (e.g., long term evolution (LTE), global system for mobile communications (GSM), worldwide interoperability for microwave access (WIMAX), ultra-wideband (UWB), wireless fidelity (Wi-Fi), near field communication (NFC), and Bluetooth).

For example, the network system 2000 may constitute one of electronic systems such as a server, a data center, a distributed computing system, and a cloud storage. Alternatively, the network system 2000 may be implemented in a single electronic device. The present disclosure is not limited to these examples, and the network system 2000 may be variously changed or modified to include components connected through the network 2005.

As described with reference to FIGS. 1 and 2, there may be various protocols for facilitating communication between components of the electronic system 1000 and the network system 2000. Each component or device may operate in compliance with a protocol employed by the component or device, and to this end, may include hardware resources (e.g., analog circuits of a physical layer, logic circuits of a logical layer, and a processor handling an application layer) configured to perform processing procedures defined by the protocol.

However, due to limitations on hardware resources such as a cost and a circuit area, it may be difficult for one single electronic device to support all kinds of protocols. For this reason, some electronic devices may operate in compliance only with an employed protocol, and may not support protocols which are not employed by the electronic devices. As types and kinds of protocols are developed and evolve variously, applicability of an electronic device which does not support various protocols may be degraded.

Example embodiments of the present disclosure may provide an electronic device which adaptively supports a plurality of protocols depending on requests received from an outside of the electronic device. For example, the storage device 1300 or 2300 according to example embodiments may be configured to adaptively support a protocol which is suitable to process data communicated with a host. Accordingly, the storage device 1300 or 2300 may suitably communicate with the host irrespective of a kind of a protocol required by the host, and thus applicability of the storage device 1300 or 2300 may be improved.

Example embodiments associated with the storage device 1300 or 2300 will be described with reference to FIGS. 3 to 28. However, the present disclosure is not limited thereto and may be applied to any kind of device. For example, the example embodiments may be employed for the working memory 1200, the main processor 1101, and the host 2100. The following descriptions are provided to facilitate better understanding, and are not intended to limit the present disclosure.

Figure 3:
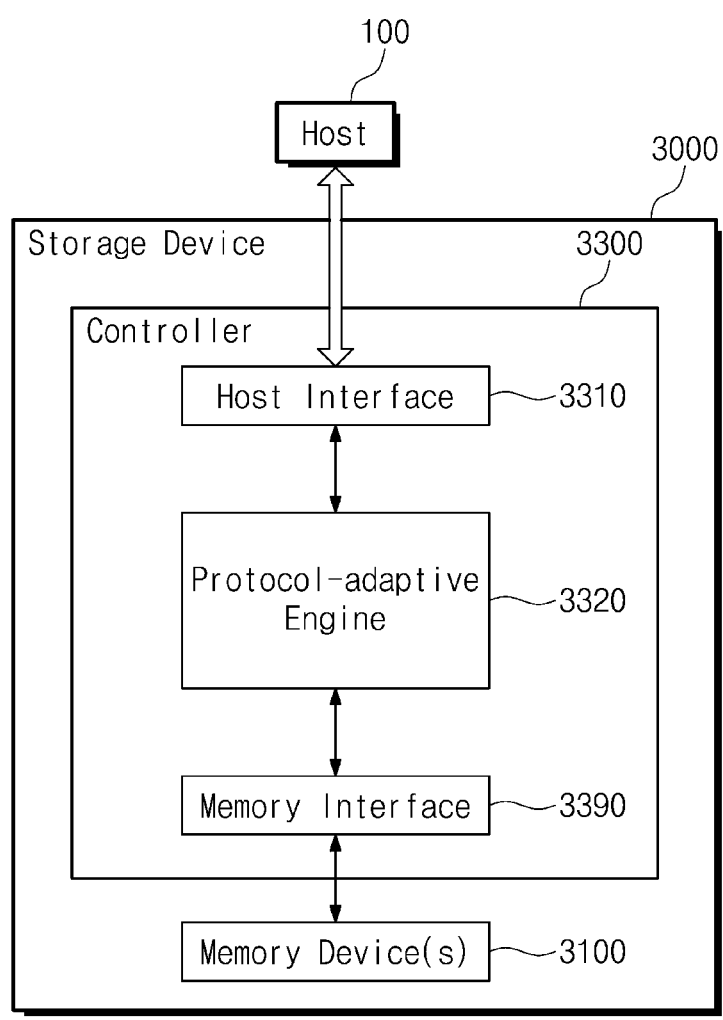
FIG. 3 is a block diagram illustrating an example configuration associated with a storage device of FIG. 1 or 2.

FIG. 3 is a block diagram illustrating an example configuration associated with the storage device 1300 or 2300 of FIG. 1 or 2. In some example embodiments, the storage device 1300 or 2300 of FIG. 1 or 2 may include a storage device 3000 of FIG. 3.

The storage device 3000 may provide a storage service for a host 100. The host 100 may be an object which is capable of accessing the storage device 3000 from an outside of the storage device 3000. The storage device 3000 may include at least one memory device 3100 and a controller 3300. The controller 3300 may include a host interface circuit 3310, a protocol-adaptive engine 3320, and a memory interface circuit 3390.

The host interface circuit 3310 may facilitate communication with the outside of the storage device 3000 (e.g., communication with the host 100). The host interface circuit 3310 may correspond to a physical layer including analog circuits such as a transmitter/receiver, an equalizer, a clock and data recovery (CDR) circuit, and a modulator/demodulator. The memory interface circuit 3390 may provide the memory device 3100 with data to be stored to the memory device 3100 and may receive data output from the memory device 3100.

The protocol-adaptive engine 3320 may correspond to a logical layer between the host interface circuit 3310 and the memory interface circuit 3390. The protocol-adaptive engine 3320 may perform logical operations to convert an output of the host interface circuit 3310 to a format required by the memory interface circuit 3390 and to convert an output of the memory interface circuit 3390 to a format required by the host interface circuit 3310.

The protocol-adaptive engine 3320 may be employed to adaptively support a plurality of protocols depending on requests received from the host 100. For example, when a first request is received by the host interface circuit 3310 in compliance with a first protocol, the protocol-adaptive engine 3320 may perform logical operations associated with the first protocol.

On the other hand, when a second request is received by the host interface circuit 3310 in compliance with a second protocol different from the first protocol, the protocol-adaptive engine 3320 may perform logical operations associated with the second protocol. In other words, the protocol-adaptive engine 3320 may support a protocol adaptively in response to a type or a kind of a protocol required by the host 100.

Even though a new protocol is proposed or a revision of an existing protocol is required, the protocol-adaptive engine 3320 may support the new or revised protocol actively. Accordingly, the storage device 3000 may communicate with any host, and applicability of the storage device 3000 may be improved.

In addition, a plurality of protocols may be supported by only the protocol-adaptive engine 3320, and an additional hardware resource may not be required to support various protocols. For example, the controller 3300 may support both the first protocol and the second protocol by using only the protocol-adaptive engine 3320, instead of including logic circuits performing logical operations associated with the first protocol and separate logic circuits performing logical operations associated with the second protocol. Accordingly, it may be advantageous to employ the protocol-adaptive engine 3320 in terms of a cost and a circuit area.

Figure 4:
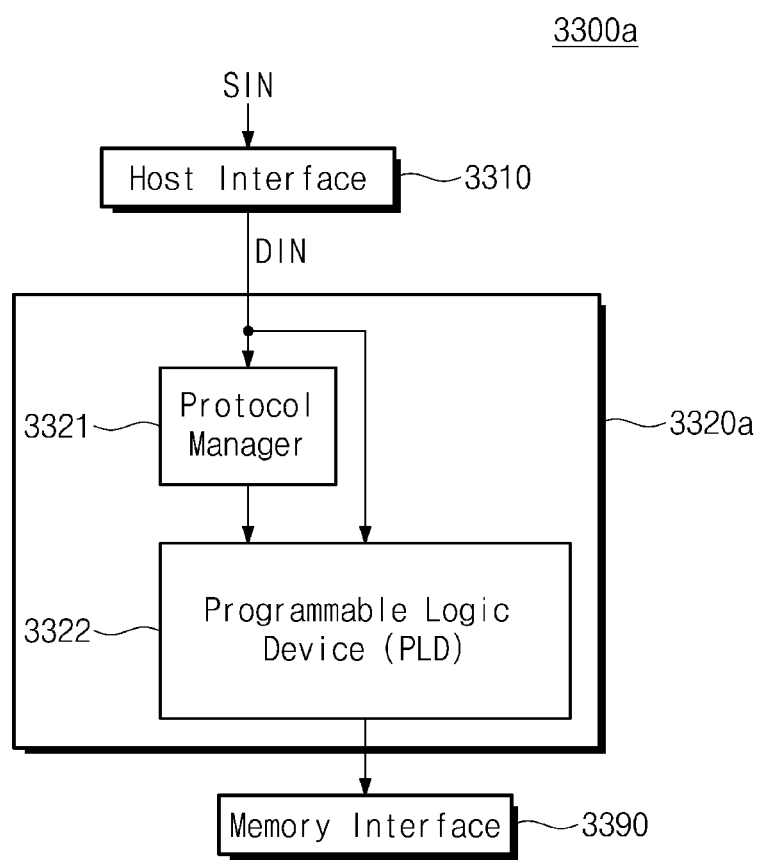
FIG. 4 is a block diagram illustrating an example configuration associated with a controller of FIG. 3.

FIG. 4 is a block diagram illustrating an example configuration associated with the controller 3300 of FIG. 3. In some example embodiments, the controller 3300 of FIG. 3 may include a controller 3300a of FIG. 4.

The protocol-adaptive engine 3320 of FIG. 3 may include a protocol-adaptive engine 3320a of FIG. 4. In some example embodiments, the protocol-adaptive engine 3320a may include a protocol manager 3321 and a programmable logic device (PLD) 3322.

The host interface circuit 3310 may receive a signal SIN from the host 100. For example, the host 100 may transmit the signal SIN to the storage device 3000 to provide the storage device 3000 with a request, a response, and/or data intended by the host 100. The signal SIN may be received with regard to a protocol required by the host 100.

The host interface circuit 3310 may output a packet DIN which may be processed by the protocol-adaptive engine 3320a, based on the signal SIN. The packet DIN may be obtained from the signal SIN, and thus may include the request, the response, and/or the data intended by the host 100. The packet DIN may be provided to the protocol manager 3321 and the programmable logic device 3322.

Herein, the term "packet" is provided to facilitate better understanding, and is not intended to limit a form of the packet DIN. The packet DIN may be variously changed or modified to have a form of a packet, data, a symbol, a voltage level, a bit value, and/or the like, to indicate the request, the response, and/or the data intended by the host 100.

The protocol manager 3321 may determine a protocol corresponding to a request (e.g., the request included in the packet DIN corresponding to the signal SIN) received from the outside of the storage device 3000 (e.g., from the host 100), based on the packet DIN. The packet DIN may be referenced to determine a protocol, which will be described with reference to FIG. 7.

The programmable logic device 3322 may be reconfigurable to support a plurality of protocols adaptively. For example, the programmable logic device 3322 may be implemented in a device (e.g., a complex programmable logic device (CPLD), a field programmable gate array (FPGA), an embedded FPGA (eFPGA), and/or the like) which is flexibly programmable depending on an image file or an external control.

For example, the programmable logic device 3322 may be programmed to a first state based on first configuration data (or a first image file). In the first state, the programmable logic device 3322 may perform logical operations for supporting the first protocol. For example, when the programmable logic device 3322 is implemented in the FPGA, the programming of the programmable logic device 3322 may mean arranging and connecting logic gates and lookup tables of the FPGA suitably such that the FPGA generates an intended output based on a particular input.

For example, the programmable logic device 3322 may be programmed to a second state based on second configuration data (or a second image file). In the second state, the programmable logic device 3322 may perform logical operations for supporting the second protocol different from the first protocol.

The programmable logic device 3322 may be reconfigured from the first state to the second state or from the second state to the first state. Accordingly, the programmable logic device 3322 may support both the first protocol and the second protocol.

The protocol manager 3321 may control the programming of the programmable logic device 3322 directly or indirectly such that the programmable logic device 3322 is programmed to a state for supporting a protocol determined by the protocol manager 3321. For example, when it is determined that the first protocol is required, the protocol manager 3321 may control the programming of the programmable logic device 3322 to the first state.

Accordingly, it may be understood as the programmable logic device 3322 being programmed or reconfigured to support an intended protocol based on a request of the host 100 (e.g., based on the signal SIN or the packet DIN) under control of the protocol manager 3321. As the programmable logic device 3322 is reconfigurable, the programmable logic device 3322 may adaptively support a plurality of protocols depending on requests received from outside the storage device 3000.

The programmable logic device 3322 may perform logical operations on the packet DIN. The logical operations may be performed in compliance with a protocol supported by a programmed state of the programmable logic device 3322. Accordingly, the programmable logic device 3322 may process requests of the host 100 in compliance with a protocol corresponding to a programmed state among a plurality of protocols.

As the programmable logic device 3322 is employed, the controller 3300*a* may operate (e.g., may process a request of the host 100) in compliance with various protocols based on a request of the host 100. The controller 3300*a* may communicate with the memory device 3100 through the memory interface circuit 3390 based on a request of the host 100, such that the memory device 3100 stores or outputs data corresponding to the request of the host 100.

In some example embodiments, the protocol manager 3321 may be implemented in a hardware circuit (e.g., a logic circuit) which is capable of performing logical operations to determine a suitable protocol based on the packet DIN and to control the programming of the programmable logic device 3322.

In some example embodiments, all or some of logical operations of the protocol manager 3321 may be implemented in a program code of software or firmware and may be executed by a processor core included in the controller 3300*a*. The hardware circuit of the protocol manager 3321 and the processor of the controller 3300*a* may be understood as an operation circuit configured to perform the logical operations.

Figure 5:
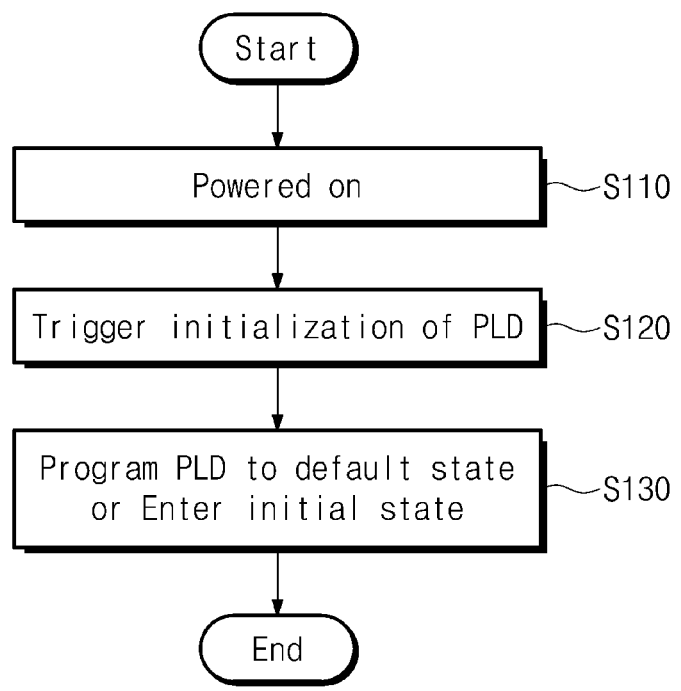
FIGS. 5 and 6 are flowcharts describing an example operation of a controller of FIG. 4.

FIG. 5 is a flowchart describing an example operation of the controller 3300*a* of FIG. 4.

When power is supplied to the storage device 3000, the controller 3300*a* may start to operate based on the power (power-on) (S110). Alternatively, when the controller 3300*a* has been reset (e.g., when has been powered down and then powered on) to resolve an error or a failure or to protect a device, the power may be continuously supplied to the controller 3300*a* (power-on).

When the power supply to the programmable logic device 3322 is interrupted, an existing programmed state of the programmable logic device 3322 may be lost. In response to the power-on of the controller 3300*a*, an operation circuit (e.g., the protocol manager 3321) may trigger initialization of the programmable logic device 3322 (S120). In response to the trigger, the programmable logic device 3322 may be programmed to a default state or may enter an initial state (S130).

For example, a reset signal (e.g., a power-on reset (POR) signal after the power supply begins or is resumed, a controller reset signal after an error or a failure occurs, and/or the like) may be used to trigger the default state or the initial state of the programmable logic device 3322. The protocol manager 3321 may control the initialization of the programmable logic device 3322 based on the reset signal. However, the initialization of the programmable logic device 3322 may be triggered based on another signal, but the present disclosure is not limited to this example.

Figure 6:
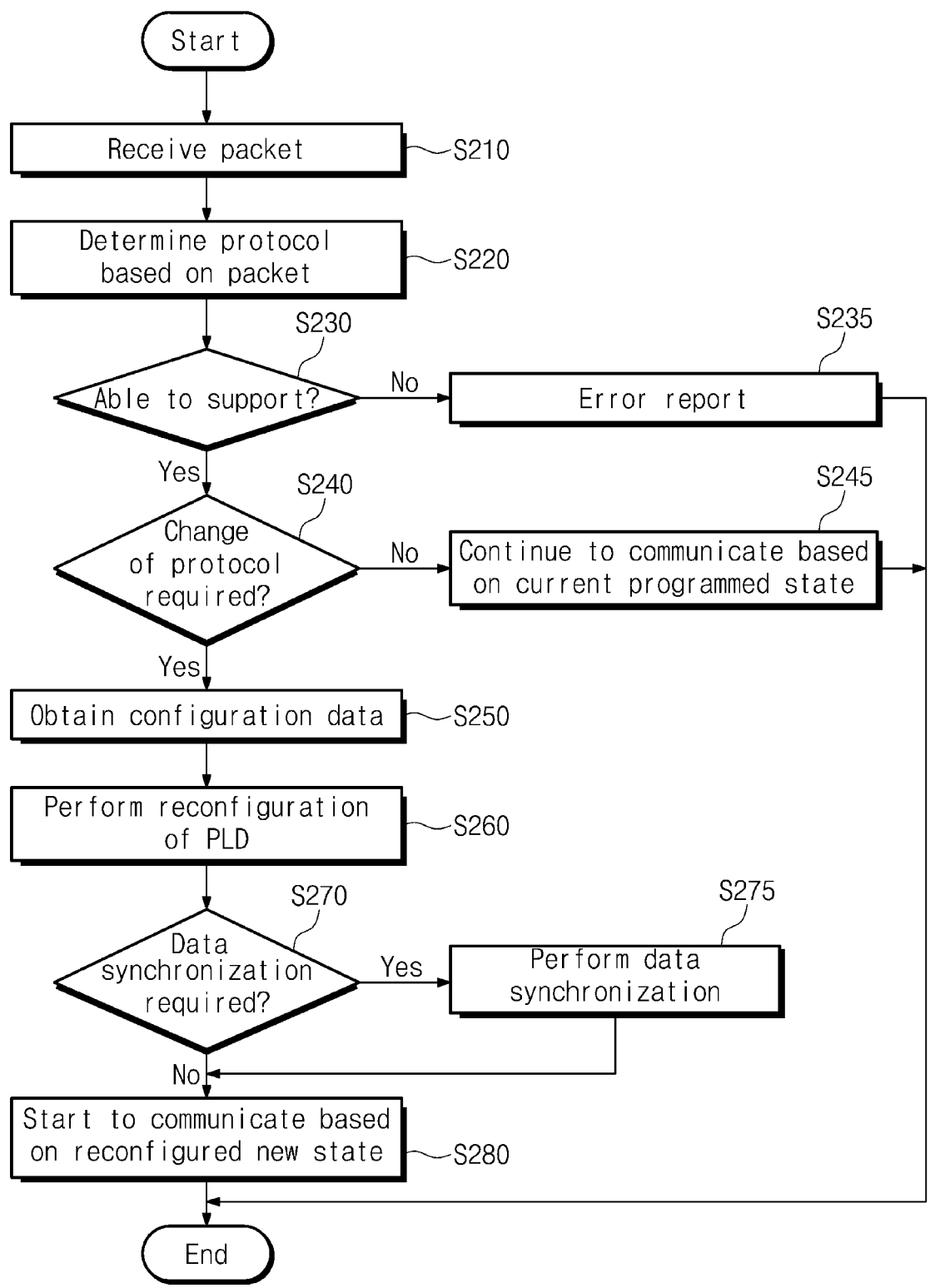

FIG. 6 is a flowchart describing an example operation of the controller 3300*a* of FIG. 4.

The controller 3300*a* may receive a request (e.g., a request included in the packet DIN corresponding to the signal SIN) in compliance with an intended protocol among a plurality of protocols from the host 100 through the host interface circuit 3310 (S210). The protocol manager 3321 may determine a protocol corresponding to the received request, based on the packet DIN (S220).

When the determined protocol is not supported (No of S230), the controller 3300*a* may output an error report to the host 100 (S235). When the programmable logic device 3322 may support the determined protocol (Yes of S230), the protocol manager 3321 may determine whether a currently programmed state of the programmable logic device 3322 corresponds to the determined protocol or whether changing a protocol is required (S240).

When changing the protocol is not required (No of S240), the controller 3300*a* may continue to communicate with the host 100 based on the currently programmed state of the programmable logic device 3322 (S245). When changing the protocol is required (Yes of S240), the programmable logic device 3322 may obtain configuration data under control of the protocol manager 3321 (S250).

The programmable logic device 3322 may be reconfigured from the currently programmed state to a new state corresponding to the determined protocol, based on the configuration data (S260). As the programmable logic device 3322 is programmed to the new state, the programmable logic device 3322 may support the determined protocol.

For example, when a first request is received with regard to a first protocol, the programmable logic device 3322 may be programmed to a first state for supporting the first protocol based on the first request. After the programmable logic device 3322 is programmed to the first state, a second request may be received from the host 100 with regard to a second protocol different from the first protocol. The protocol manager 3321 may control the programming of the programmable logic device 3322 based on the second request such that the programmable logic device 3322 is programmed to a second state for supporting the second protocol. Accordingly, the programmable logic device 3322 may be reconfigured from the first state to the second state.

As such, when a protocol corresponding to a request received from the host 100 is changed, the programmable logic device 3322 may be reconfigured to support the changed protocol. However, example embodiments may not require an additional hardware resource supporting the changed protocol. Processes of obtaining configuration data and performing reconfiguration will be described with reference to FIGS. 8 to 12.

In some example embodiments, the reconfiguration of the programmable logic device 3322 may be partially performed on a portion of settings (e.g., arrangement and connection of logic gates and LUTs of the FPGA) of the programmable logic device 3322. The programmable logic device 3322 may perform the reconfiguration only on some settings which are required to be newly programmed. In this example embodiment, a time taken to perform the reconfiguration may be shortened.

For example, settings of the programmable logic device 3322 in the second state may include first settings and second settings, where the first settings may be identical to respective settings of the programmable logic device 3322 in the first state and the second settings may be different from respective settings of the programmable logic device 3322 in the first state. The first settings after the reconfiguration may be identical to the first settings before the reconfiguration, and the second settings after the reconfiguration may be different from the second settings before the reconfiguration. In this case, during the reconfiguration, the first settings may not need to be newly programmed and the second settings may be required to be newly programmed. For example, the reconfiguration from the first state to the second state may be performed only on the second settings without changing the first settings (partial reconfiguration).

While the programmable logic device 3322 is programmed to the new state (reconfiguration), the programmable logic device 3322 may not process the request of the host 100. Accordingly, in some cases, after the reconfiguration is completed, data synchronization may be required to process the request of the host 100 or the packet DIN (Yes of S270) and the data synchronization may be performed to process the request of the host 100 or the packet DIN at a suitable timing (S275).

When the data synchronization is not required (No of S270) or after the data synchronization is completed, the controller 3300a may communicate with the host 100 based on the reconfigured new state of the programmable logic device 3322 (S280). The controller 3300a may control the memory device 3100 such that the memory device 3100 stores or outputs data corresponding to the request received with regard to the changed protocol.

Figure 7:
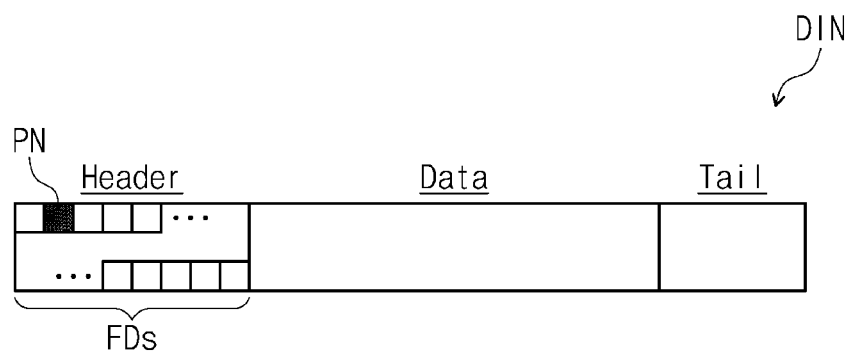
FIG. 7 is a conceptual diagram for describing an example operation of a protocol manager of FIG. 4.

FIG. 7 is a conceptual diagram for describing an example operation of the protocol manager 3321 of FIG. 4.

For example, the packet DIN may have a form of a packet including a header, data, and a tail. For example, the header of the packet DIN may include fields FDs including a variety of information. However, it may be readily understood that the form of the packet DIN may be variously changed or modified without being limited to the example of FIG. 7.

Attributes (such as a configuration, an arrangement, and information) of the fields FDs may be different for each of protocols. For example, attributes of the fields FDs associated with a first protocol may be different from attributes of the fields FDs associated with a second protocol. The protocol manager 3321 may determine a protocol corresponding to the packet DIN, with reference to attributes of the fields FDs.

In some examples, the fields FDs may include a protocol information field PN which indicates the protocol corresponding to the packet DIN. In this case, the protocol manager 3321 may determine the protocol corresponding to the packet DIN, with reference to the protocol information field PN. However, determining a protocol is not limited thereto, and may be variously changed or modified to adaptively support the protocol corresponding to the packet DIN.

Figure 8:
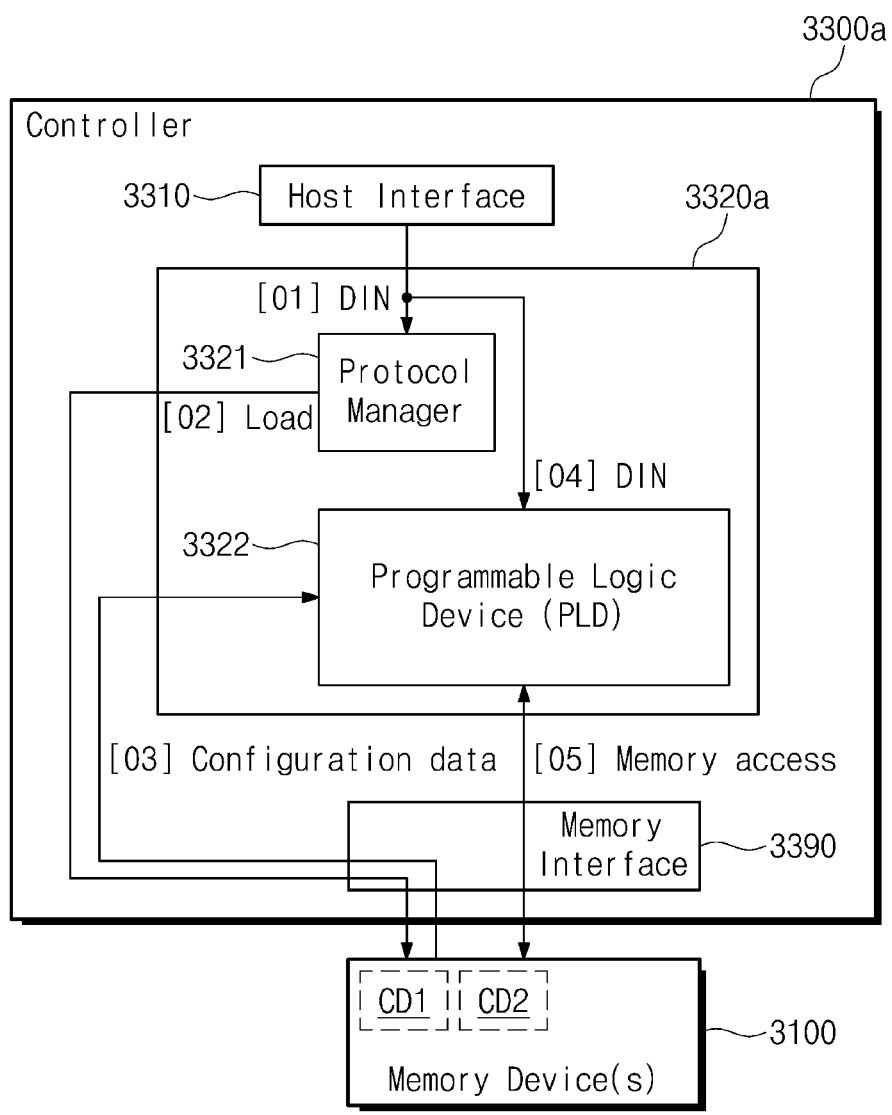
FIGS. 8 to 12 are conceptual diagrams for describing an example operation of a storage device of FIG. 3 including a controller of FIG. 4.

FIG. 8 is a conceptual diagram for describing an example operation of the storage device 3000 of FIG. 3 including the controller 3300a of FIG. 4.

The protocol manager 3321 may receive the packet DIN from the host interface circuit 3310 (operation [01]). In some example embodiments, the protocol manager 3321 may determine a protocol corresponding to a request received from the host 100 whenever the packet DIN is received. The protocol manager 3321 may determine that the programmable logic device 3322 is required to be programmed to a new state for supporting the determined protocol.

In some example embodiments, the memory device 3100 may store configuration data CD1 and CD2. The protocol manager 3321 may output a control signal (e.g., Load) such that configuration data for programming the programmable logic device 3322 to a state for supporting the determined protocol is output from the memory device 3100 (operation [02]).

The output configuration data may be loaded on the programmable logic device 3322 through the protocol manager 3321 or may be directly loaded on the programmable logic device 3322 (operation [03]). Accordingly, the protocol manager 3321 may control the programming or the reconfiguration of the programmable logic device 3322 directly or indirectly.

The programmable logic device 3322 may be reconfigured to the state for supporting the determined protocol, based on the configuration data. The programmable logic device 3322 may perform logical operations corresponding to the determined protocol on the packet DIN (operation [04]).

Accordingly, the controller 3300a may process the request of the host 100 and may communicate with the memory device 3100 through the memory interface circuit 3390 (operation [05]). The memory device 3100 may store or output data corresponding to the request of the host 100.

As such, the controller 3300a may receive the configuration data from the memory device 3100 such that the programmable logic device 3322 is programmed based on the configuration data. For example, while the controller 3300a is configured to operate in compliance with the first protocol, when a request associated with the second protocol different from the first protocol is received, a transaction between the controller 3300a and the memory device 3100 may be performed based on the received request. The transaction may be performed to read the configuration data from the memory device 3100.

After the transaction, the reconfiguration of the programmable logic device 3322 may be performed. Accordingly, after the transaction is performed and a time for the reconfiguration passes, the controller 3300a may start to process the received request in compliance with the second protocol. An operation of the controller 3300a may be changed based on the configuration data, to process the received request in compliance with the second protocol.

Figure 9:
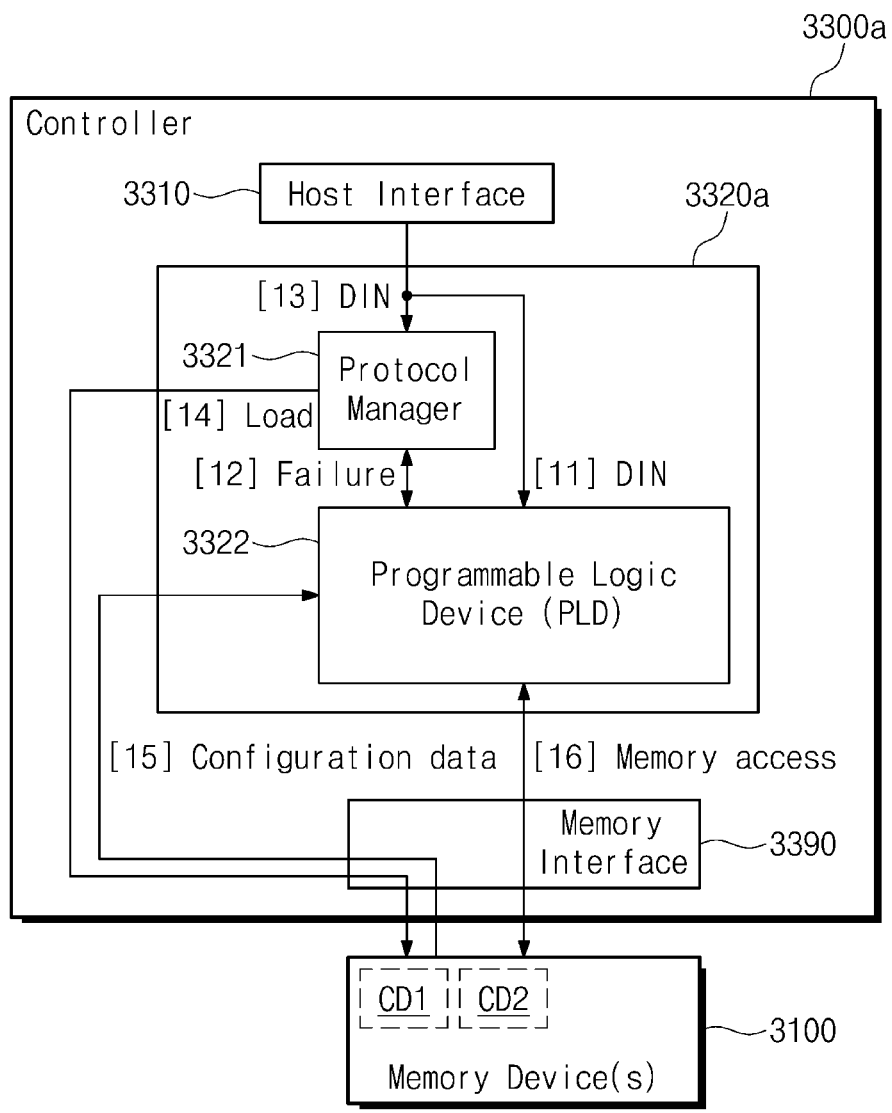

FIG. 9 is a conceptual diagram for describing an example operation of the storage device 3000 of FIG. 3 including the controller 3300a of FIG. 4.

The programmable logic device 3322 may receive the packet DIN (operation [11]). In some cases, a currently programmed state of the programmable logic device 3322 may be unable to process the packet DIN. The programmable logic device 3322 may inform the programmable manager 3321 of a processing failure (operation [12]).

In some example embodiments, the protocol manager 3321 may determine a protocol corresponding to a request received from the host 100 based on the packet DIN, in response to the notification of the processing failure (operation [13]). The protocol manager 3321 may output a control signal (e.g., Load) such that configuration data is output from the memory device 3100 (operation [14]).

The output configuration data may be loaded on the programmable logic device 3322 (operation [15]). The programmable logic device 3322 may be reconfigured to a state for supporting the determined protocol, based on the configuration data. Accordingly, the controller 3300a may process the request of the host 100 and may communicate with the memory device 3100 (operation [16]).

Figure 10:
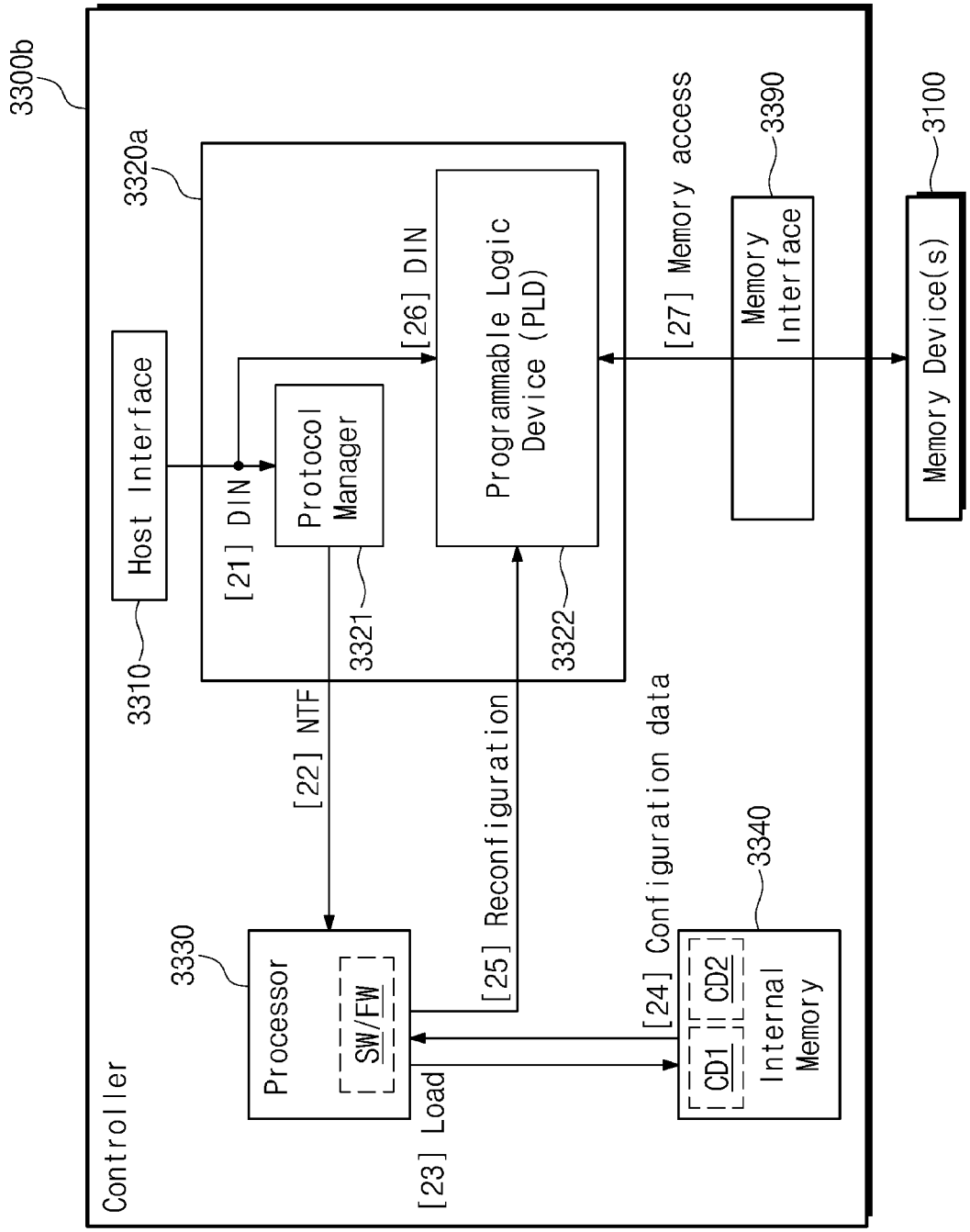

FIG. 10 is a conceptual diagram for describing an example operation of the storage device 3000 of FIG. 3 including the controller 3300a of FIG. 4. In some example embodiments, the controller 3300a of FIG. 4 may include a controller 3300b of FIG. 10. The controller 3300b may include a processor 3330 and an internal memory 3340.

The protocol manager 3321 may receive the packet DIN (operation [21]), and may determine a protocol corresponding to a request received from the host 100 based on the packet DIN. The protocol manager 3321 may provide the processor 3330 with a notification NTF including information of the determined protocol (operation [22]).

The processor 3330 may perform various operations by executing software SW and/or firmware FW on one or more processor cores included in the processor 3330. In some example embodiments, the internal memory 3340 may store the configuration data CD1 and CD2. The processor 3330 may output a control signal (e.g., Load) such that configuration data is output from the internal memory 3340 (operation [23]).

The processor 3330 may obtain the configuration data output from the internal memory 3340 (operation [24]) and may control the programmable logic device 3322 such that the programmable logic device 3322 is reconfigured to a state for supporting the determined protocol based on the configuration data (operation [25]).

After the reconfiguration is completed, the programmable logic device 3322 may perform logical operations corresponding to the determined protocol on the packet DIN (operation [26]). Accordingly, the controller 3300b may process the request of the host 100 and may communicate with the memory device 3100 (operation [27]).

In the example embodiment of FIG. 10, the protocol manager 3321 may be dedicated to determining a protocol and the processor 3330 may control the reconfiguration of the programmable logic device 3322. In other example embodiments, without the protocol manager 3321, the processor 3330 may determine a protocol by executing the software SW and/or the firmware FW.

Figure 11:
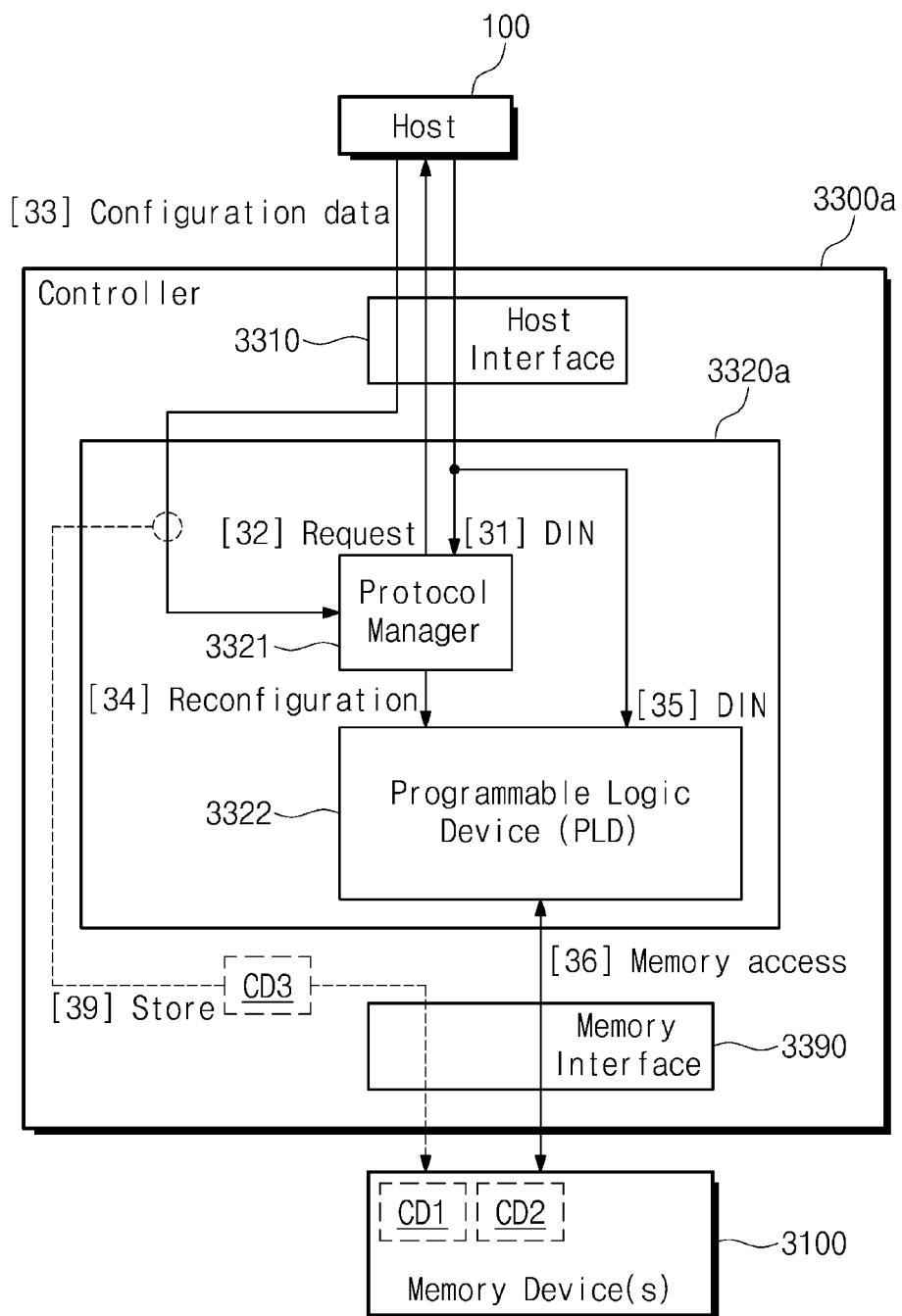

FIG. 11 is a conceptual diagram for describing an example operation of the storage device 3000 of FIG. 3 including the controller 3300a of FIG. 4.

The protocol manager 3321 may receive the packet DIN (operation [31]) and may determine a protocol corresponding to a request received from the host 100 based on the packet DIN. In some cases, the protocol manager 3321 may determine that configuration data CD3 which is used to support the determined protocol is not stored in the storage device 3000.

In some example embodiments, the protocol manager 3321 may actively request the host 100 to provide configuration data which is required to reconfigure the programmable logic device 3322 (operation [32]). For example, the protocol manager 3321 may output a control signal such that configuration data for programming the programmable logic device 3322 to a state for supporting the determined protocol is received from the host 100. In some example embodiments, the error report (S235 of FIG. 6) may be used as the control signal.

The controller 3300a may receive the configuration data from the host 100 such that the programmable logic device 3322 is programmed based on the configuration data (operation [33]). For example, while the controller 3300a is configured to operate in compliance with a first protocol, when a request associated with a second protocol different from the first protocol is received, a transaction between the controller 3300a and the host 100 may be performed based on the received request. The transaction may be performed to receive the configuration data from the host 100.

After the transaction, the received configuration data may be loaded on the programmable logic device 3322 through the protocol manager 3321 or may be directly loaded on the programmable logic device 3322. The programmable logic device 3322 may be reconfigured to the state for supporting the determined protocol, based on the configuration data (operation [34]). Accordingly, an operation of the controller 3300a may be changed based on the configuration data, to process the received request in compliance with the second protocol.

After the transaction is performed and a time for the reconfiguration passes, the controller 3300a may start to process the received request in compliance with the second protocol. The programmable logic device 3322 may perform logical operations corresponding to the determined protocol on the packet DIN (operation [35]). Accordingly, the controller 3300a may process the request of the host 100 and may communicate with the memory device 3100 (operation [36]).

In some example embodiments, the controller 3300a may receive the configuration data from both the memory device 3100 and the host 100. The controller 3300a may perform the reconfiguration of the programmable logic device 3322 based on more suitable configuration data among the configuration data received from the memory device 3100 and the configuration data received from the host 100. For example, the programmable logic device 3322 may be programmed or reconfigured based on configuration data, which provides a newer version of the determined protocol, among the configuration data received from the memory device 3100 and the configuration data received from the host 100.

In some example embodiments, when the configuration data CD3 is received from the host 100 and has not been stored in the memory device 3100, the controller 3300a may control the memory device 3100 such that the configuration data CD3 is stored in the memory device 3100 (operation [39]). Afterwards, the configuration data CD3 may be read from the memory device 3100 instead of being received from the host 100.

Figure 12:
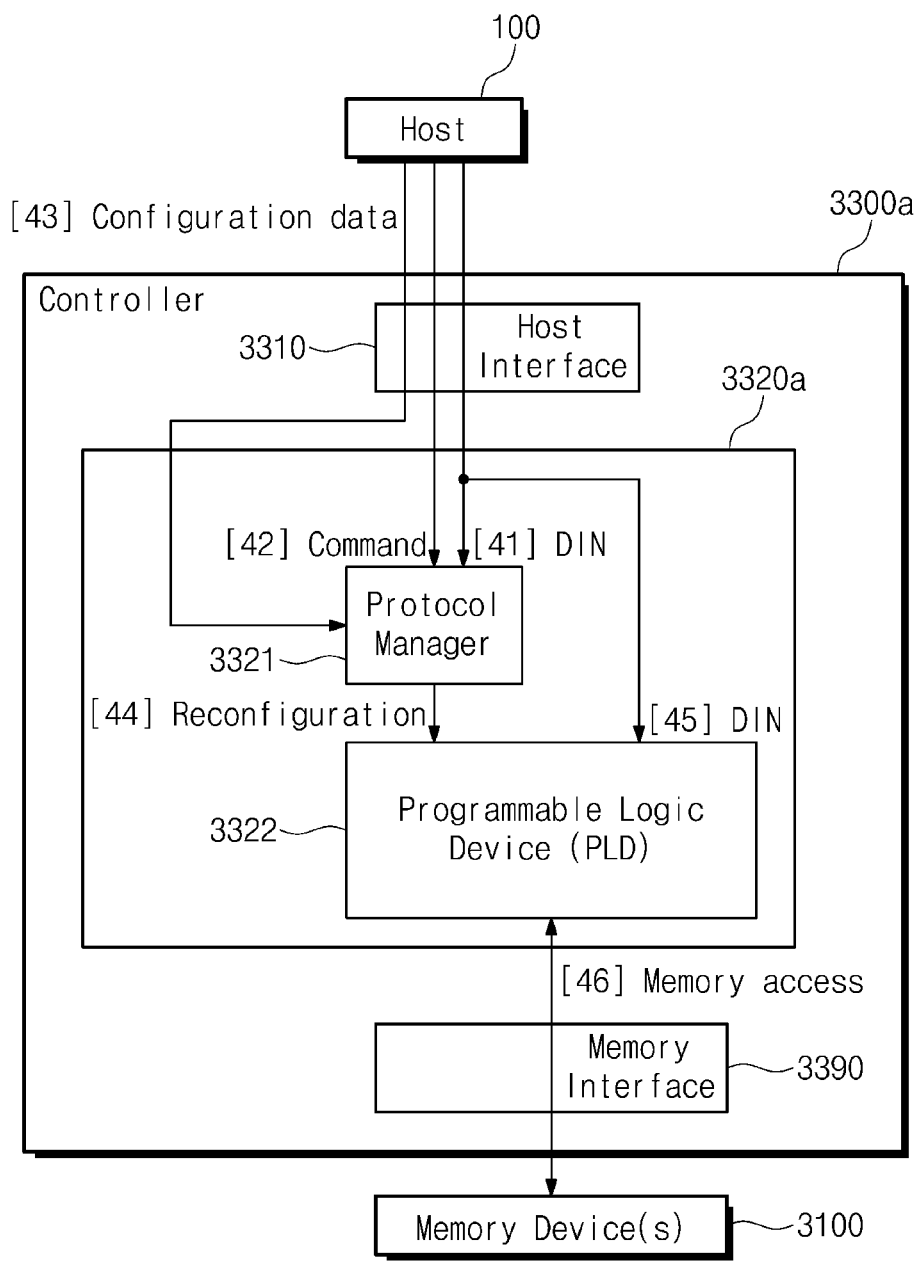

FIG. 12 is a conceptual diagram for describing an example operation of the storage device 3000 of FIG. 3 including the controller 3300a of FIG. 4.

The protocol manager 3321 may receive the packet DIN (operation [41]). In some example embodiments, the host 100 may actively provide the storage device 3000 with a command for reconfiguring the programmable logic device 3322 and configuration data required for the reconfiguration (operations [42] and [43]).

The protocol manager 3321 may control the reconfiguration of the programmable logic device 3322 based on the command and the configuration data (operation [44]). After the reconfiguration is completed, the programmable logic device 3322 may perform logical operations corresponding to the determined protocol on the packet DIN (operation [45]). Accordingly, the controller 3300a may process the request of the host 100 and may communicate with the memory device 3100 (operation [46]).

FIG. 13 is a table for describing an example operation of the protocol manager 3321 of FIG. 4.

In some example embodiments, the protocol manager 3321 may manage protocol information PL. The protocol manager 3321 may include a memory for storing the protocol information PL, or the protocol information PL may be stored in the memory device 3100 or the internal memory 3340. The protocol information PL may include a list of a plurality of protocols supported by the programmable logic device 3322.

The protocol information PL may include a variety of information associated with protocols (e.g., a name of each protocol, whether each protocol is supportable by the programmable logic device 3322 (availability), whether configuration data for supporting each protocol is stored in the storage device 3000, which protocol is currently supported, and/or the like).

As the operations described with reference to FIGS. 6 to 12 are performed, the protocol manager 3321 may modify/change/update the protocol information PL. In some cases, information associated with a new protocol may be added to an empty item of the protocol information PL. The protocol manager 3321 may perform the various determination operations described with reference to FIGS. 6 to 12, based on the protocol information PL.

Figure 14:
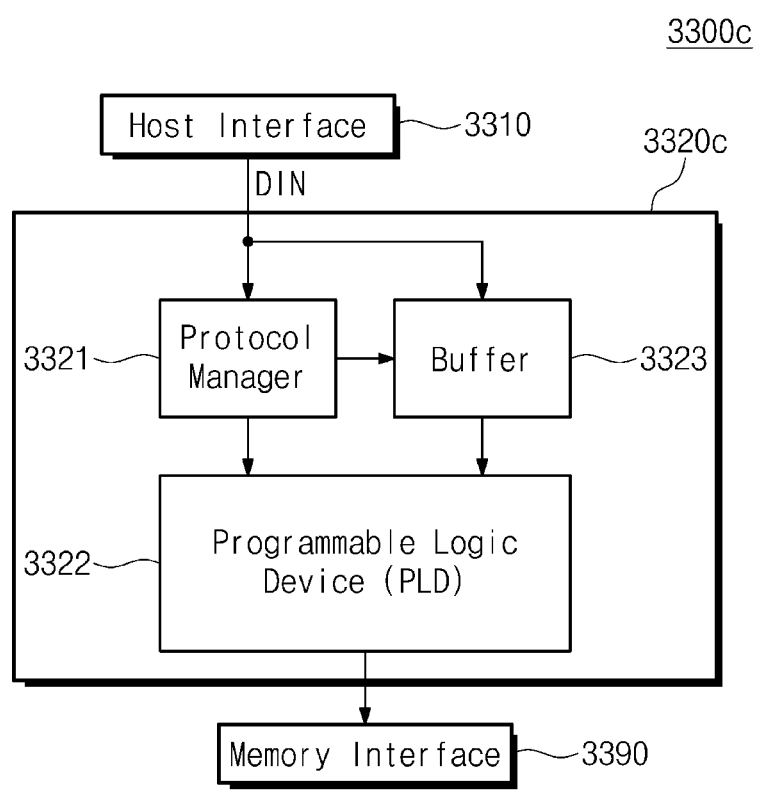
FIG. 14 is a block diagram illustrating an example configuration associated with a controller of FIG. 3.

FIG. 14 is a block diagram illustrating an example configuration associated with the controller 3300 of FIG. 3. In some example embodiments, the controller 3300 of FIG. 3 may include a controller 3300c of FIG. 14, and the protocol-adaptive engine 3320 of FIG. 3 may include a protocol-adaptive engine 3320c of FIG. 14.

The protocol-adaptive engine 3320c may include a buffer 3323. While the programmable logic device 3322 is programmed to a new state (reconfiguration), the programmable logic device 3322 may be unable to process a request of the host 100. The buffer 3323 may temporarily buffer data, which is to be later provided to the programmable logic device 3322, while the reconfiguration of the programmable logic device 3322 is performed.

For example, the buffer 3323 may buffer the packet DIN to be provided to the programmable logic device 3322 from the host interface circuit 3310 and/or a packet (which is not limited to have a form of a packet) to be provided to the programmable logic device 3322 from the memory interface circuit 3390.

While the reconfiguration of the programmable logic device 3322 is performed, a packet may be retained in the buffer 3323 without being lost. The storage device 3000 may store a packet in the buffer 3323 without rejecting a request of the host 100 while the reconfiguration of the programmable logic device 3322 is performed, and thus the quality of service (QoS) may be improved.

Figure 15:
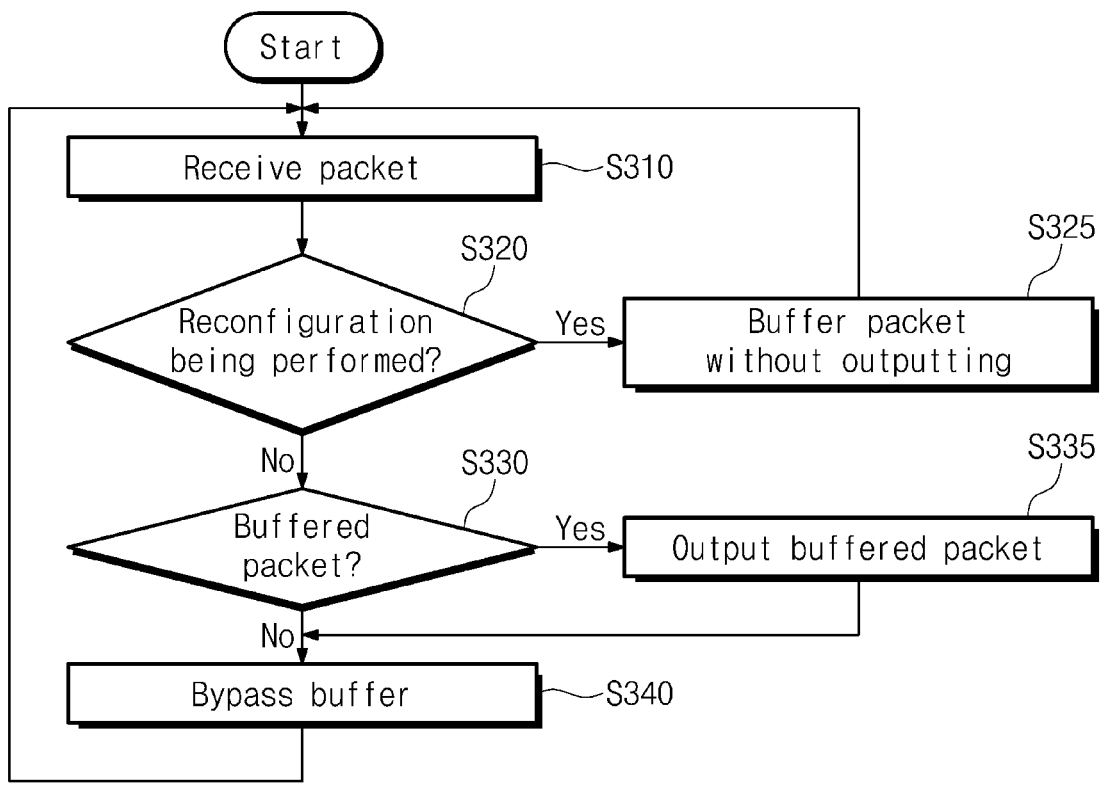
FIG. 15 is a flowchart describing an example operation of a controller of FIG. 14.
Figure 16A:
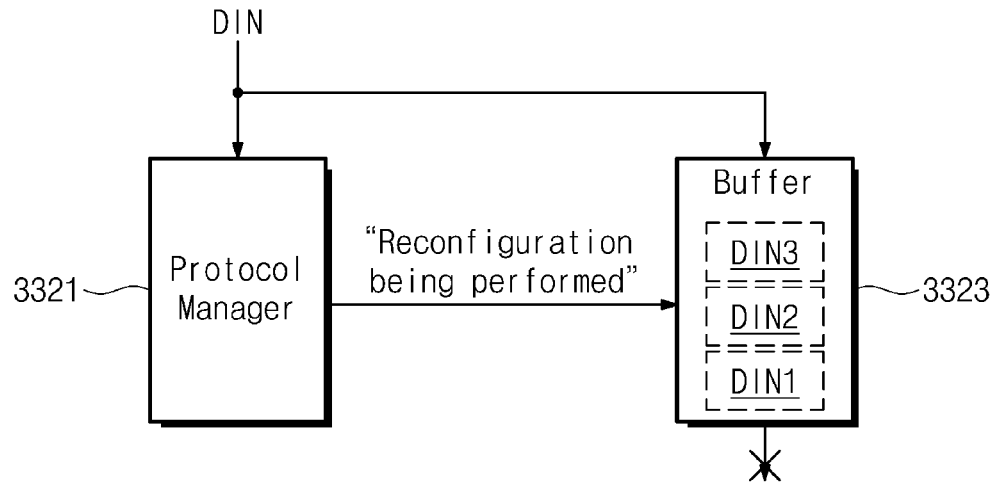
FIGS. 16A to 16C are conceptual diagrams for describing an example operation of a controller of FIG. 14.
Figure 16B:
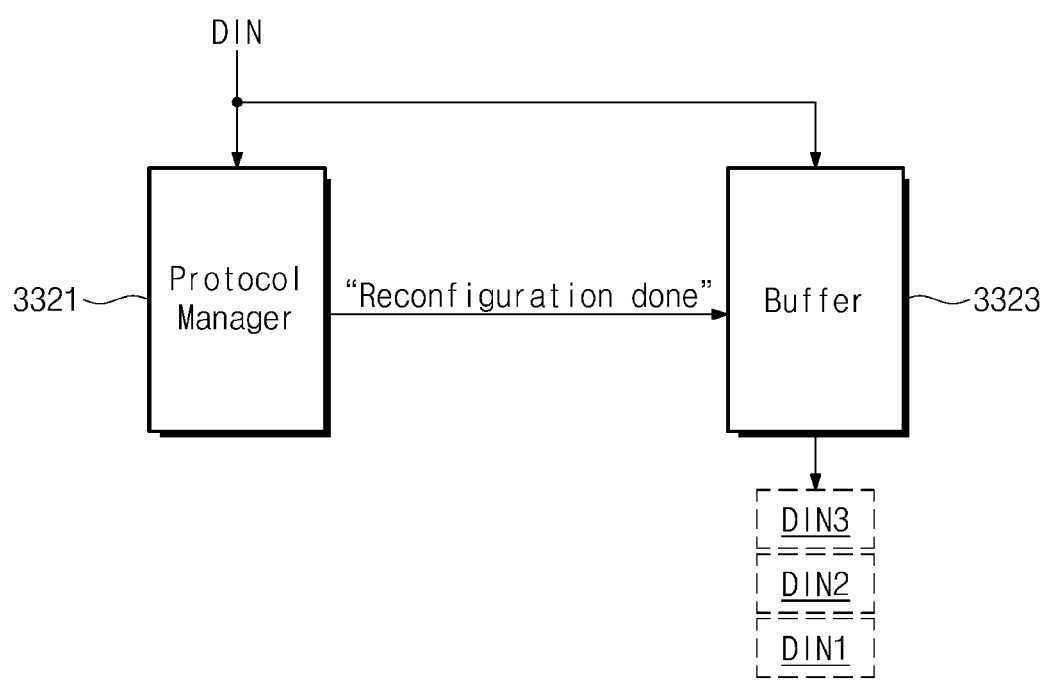
Figure 16C:
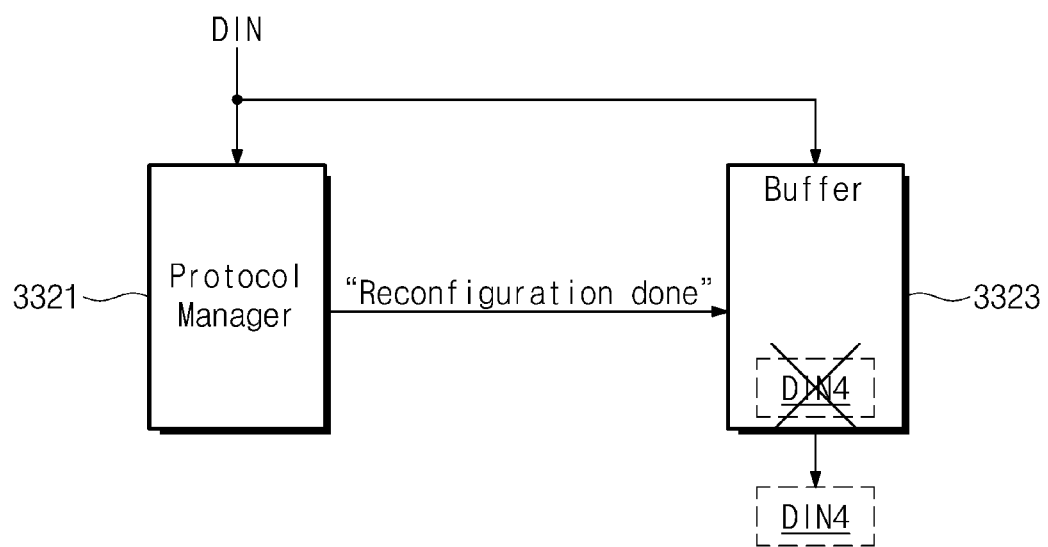

FIG. 15 is a flowchart describing an example operation of the controller 3300c of FIG. 14. FIGS. 16A to 16C are conceptual diagrams for describing an example operation of the controller 3300c of FIG. 14.

Referring to FIG. 15, the protocol manager 3321 may receive the packet DIN from the host interface circuit 3310 (S310) and may control the programming or the reconfiguration of the programmable logic device 3322. While the reconfiguration is performed (Yes of S320), the buffer 3323 may buffer the packet DIN without outputting the packet DIN (S325).

For example, referring to FIG. 16A, the protocol manager 3321 may control the buffer 3323, such that the buffer 3323 does not output a packet, based on the reconfiguration being performed. Accordingly, the buffer 3323 may buffer packets DIN1, DIN2, and DIN3 without outputting the packets DIN1, DIN2, and DIN3.

Returning to FIG. 15, in some cases, before the reconfiguration is completed, an additional request associated with the determined protocol may be received (S310, Yes of S320). The buffer 3323 may further buffer a packet obtained from the received additional request without outputting the packet.

After a time passes, the reconfiguration may be completed (No of S320). When there is a buffered packet in the buffer 3323 (Yes of S330), the buffer 3323 may output the buffered packet to the programmable logic device 3322 (S335).

For example, referring to FIG. 16B, the buffer 3323 may output the buffered packets DIN1, DIN2, and DIN3, in response to the reconfiguration being completed (i.e., while the reconfiguration is not performed). Accordingly, the programmable logic device 3322 may process the request (e.g., the packets DIN1, DIN2, and DIN3) of the host 100 in compliance with the determined protocol.

Returning to FIG. 15, when there is no buffered packet in the buffer 3323 (No of S330) or after the buffered packet is output, the buffer 3323 may output the packet DIN to the programmable logic device 3322 without buffering the packet DIN (S340). In other words, after the reconfiguration is completed, when an additional request associated with the determined protocol is received, the packet DIN may bypass the buffer 3323. For example, referring to FIG. 16C, the buffer 3323 may output a packet DIN4 received after the reconfiguration is completed, without buffering the packet DIN4.

For example, the controller 3300c may perform data synchronization with regard to a timing of processing a packet buffered in the buffer 3323 (S275 of FIG. 6). The programmable logic device 3322 may process the buffered packet output from the buffer 3323, based on the synchronized timing.

Figure 17:
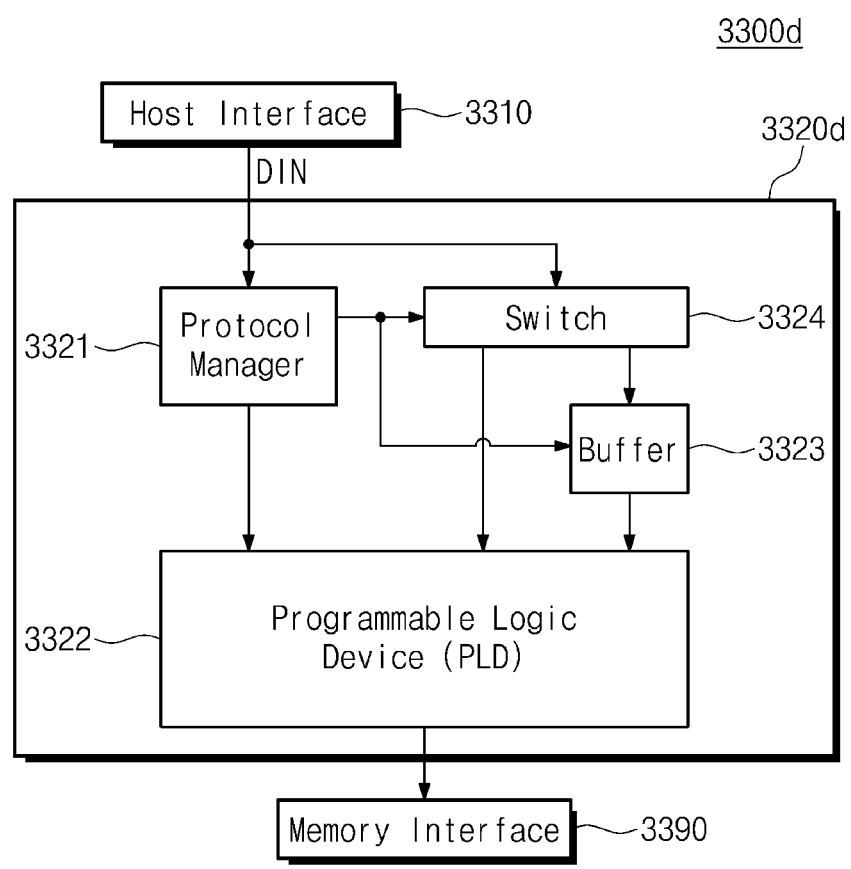
FIG. 17 is a block diagram illustrating an example configuration associated with a controller of FIG. 3.

FIG. 17 is a block diagram illustrating an example configuration associated with the controller 3300 of FIG. 3. In some example embodiments, the controller 3300 of FIG. 3 may include a controller 3300d of FIG. 17 and the protocol-adaptive engine 3320 of FIG. 3 may include a protocol-adaptive engine 3320d of FIG. 17.

The protocol-adaptive engine 3320d may include a switch circuit 3324. While the programmable logic device 3322 is being reconfigured to a new state, the switch circuit 3324 may provide a path between the host interface circuit 3310 and the buffer 3323 such that the buffer 3323 may buffer the packet DIN.

While the reconfiguration of the programmable logic device 3322 is not performed, the switch circuit 3324 may provide a path between the host interface circuit 3310 and the programmable logic device 3322 such that the programmable logic device 3322 may process the packet DIN. In this example embodiment, the packet DIN may be transferred to the programmable logic device 3322 through the switch circuit 3324 instead of bypassing the buffer 3323.

Figure 18:
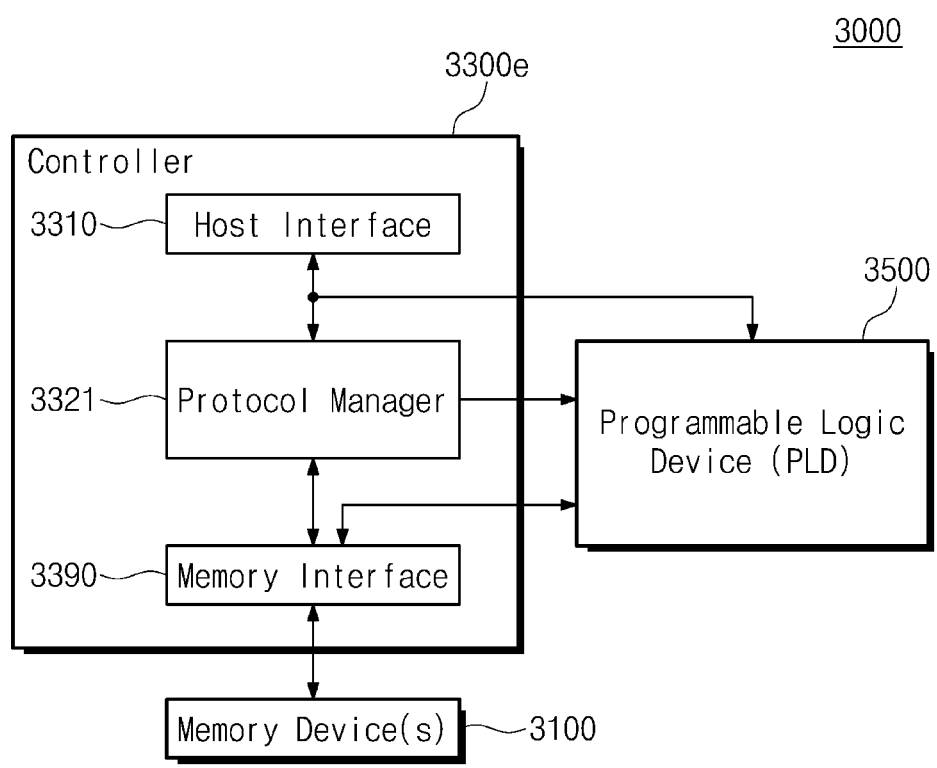
FIGS. 18 and 19 are block diagrams illustrating an example configuration of a storage device of FIG. 1 or 2.

FIG. 18 is a block diagram illustrating an example configuration associated with the storage device 1300 or 2300 of FIG. 1 or 2. In some example embodiments, the controller 3300 of FIG. 3 may include a controller 3300e of FIG. 18.

The controller 3300e may include the protocol manager 3321 and may not include the programmable logic device 3322. Rather, a programmable logic device 3500 may be provided separately from the controller 3300e. In this example embodiment, wires may be routed to connect an inside of the controller 3300e to the programmable logic device 3500 outside the controller 3300e. In some example embodiments, the protocol manager 3321 may also be provided separately from the controller 3300e.

A configuration and an operation of the programmable logic device 3500 may be substantially identical to those of the programmable logic device 3322. It may be readily understood that the example embodiments described with reference to FIGS. 4 to 17 may also be applied to the configuration of FIG. 18.

Figure 19:
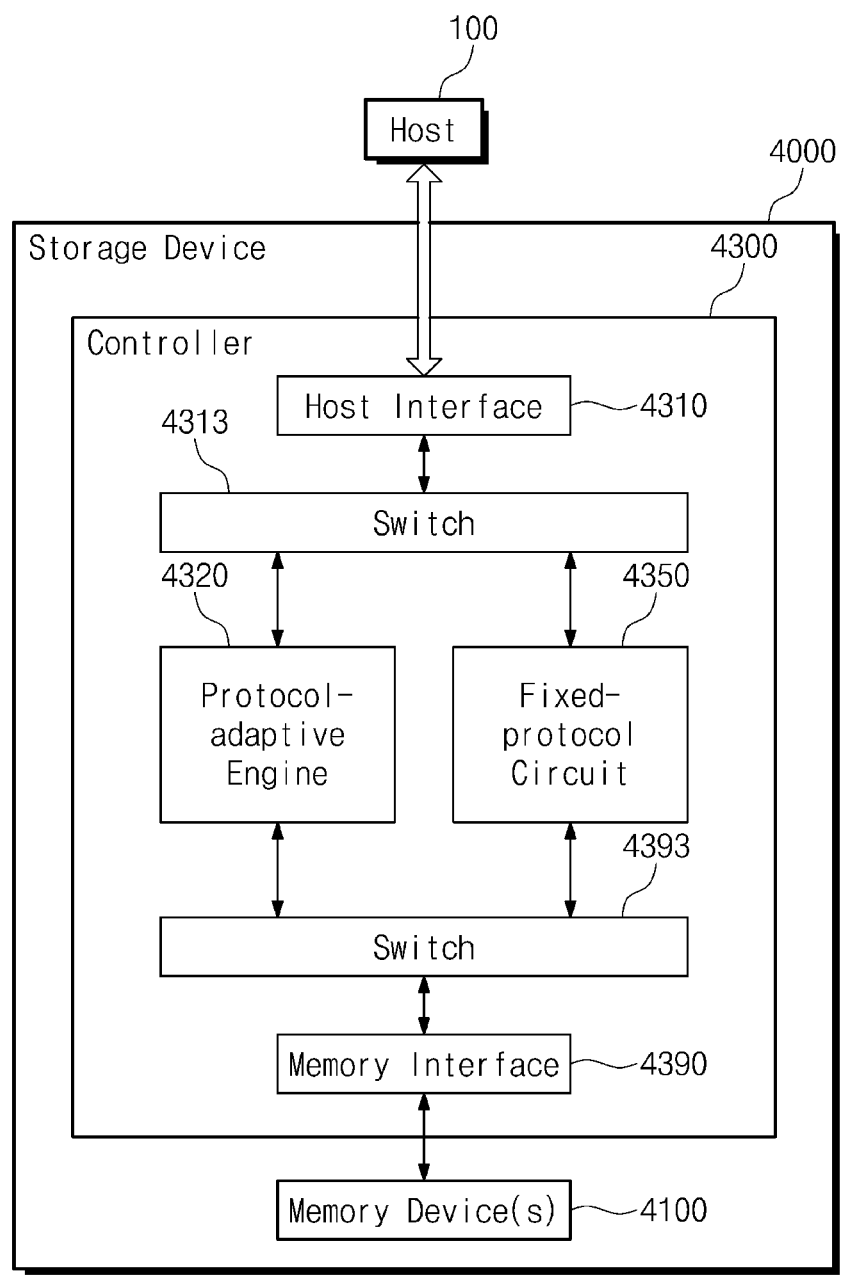

FIG. 19 is a block diagram illustrating an example configuration associated with the storage device 1300 or 2300 of FIG. 1 or 2. In some example embodiments, the storage device 1300 or 2300 of FIG. 1 or 2 may include a storage device 4000 of FIG. 19.

The storage device 4000 may include at least one memory device 4100 and a controller 4300. The controller 4300 may include a host interface circuit 4310, a switch circuit 4313, a protocol-adaptive engine 4320, a fixed-protocol circuit 4350, a switch circuit 4393, and a memory interface circuit 4390. With regard to the host interface circuit 4310, the protocol-adaptive engine 4320, and the memory interface circuit 4390, the example embodiments described with reference to FIGS. 3 to 18 may also be applied to the configuration of FIG. 19.

The fixed-protocol circuit 4350 may include a hardware circuit (e.g., a logic circuit) configured to perform logical operations for supporting one or more fixed (or selected) protocols. As the fixed-protocol circuit 4350 supports a fixed protocol, the memory device 4100 may store or output data corresponding to a request of the host 100 with regard to the fixed protocol.

For example, the fixed-protocol circuit 4350 may support only a PCIe protocol and the protocol-adaptive engine 4320 may support a plurality of protocols different from the PCIe protocol. The switches 4313 and 4393 may selectively provide a path through the protocol-adaptive engine 4320 or a path through the fixed-protocol circuit 4350, in compliance with a protocol to be supported at the controller 4300.

Figure 20:
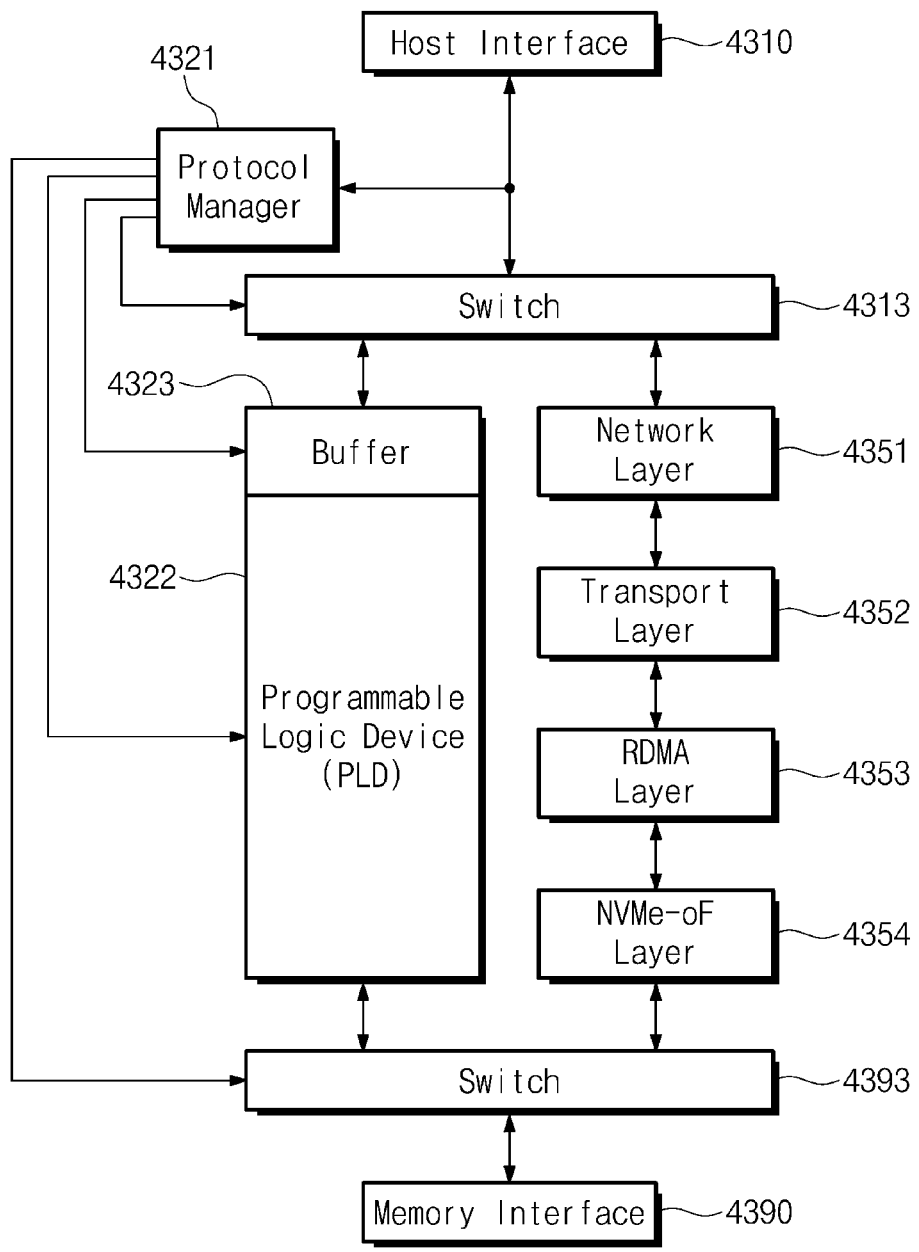
FIG. 20 is a block diagram illustrating an example configuration associated with a controller of FIG. 19.

FIG. 20 is a block diagram illustrating an example configuration associated with the controller 4300 of FIG. 19. In some example embodiments, the controller 4300 of FIG. 19 may include a controller 4300a of FIG. 20.

For example, the fixed-protocol circuit 4350 may include a network layer 4351, a transport layer 4352, a remote direct memory access (RDMA) layer 4353, and a nonvolatile memory express over fabric (NVMe-oF) layer 4354, to support an Ethernet protocol. The Ethernet protocol and layers thereof are an example for facilitating better understanding and are not intended to limit the present disclosure. A protocol which is supported by the fixed-protocol circuit 4350 may be variously changed or modified.

For example, the protocol-adaptive engine 4320 may include a protocol manager 4321, a programmable logic device 4322, and a buffer 4323, to adaptively support a plurality of protocols. The protocol manager 4321 may determine a suitable protocol based on a packet received through the host interface circuit 4310.

The protocol manager 4321 may control the switches 4313 and 4393 to select one of a path through the protocol-adaptive engine 4320 and a path through the fixed-protocol circuit 4350 based on the determined protocol. When the path through the protocol-adaptive engine 4320 is selected, the protocol manager 4321 may control the programmable logic device 4322 and the buffer 4323 similarly to the example embodiments described with reference to FIGS. 3 to 18.

Figure 21:
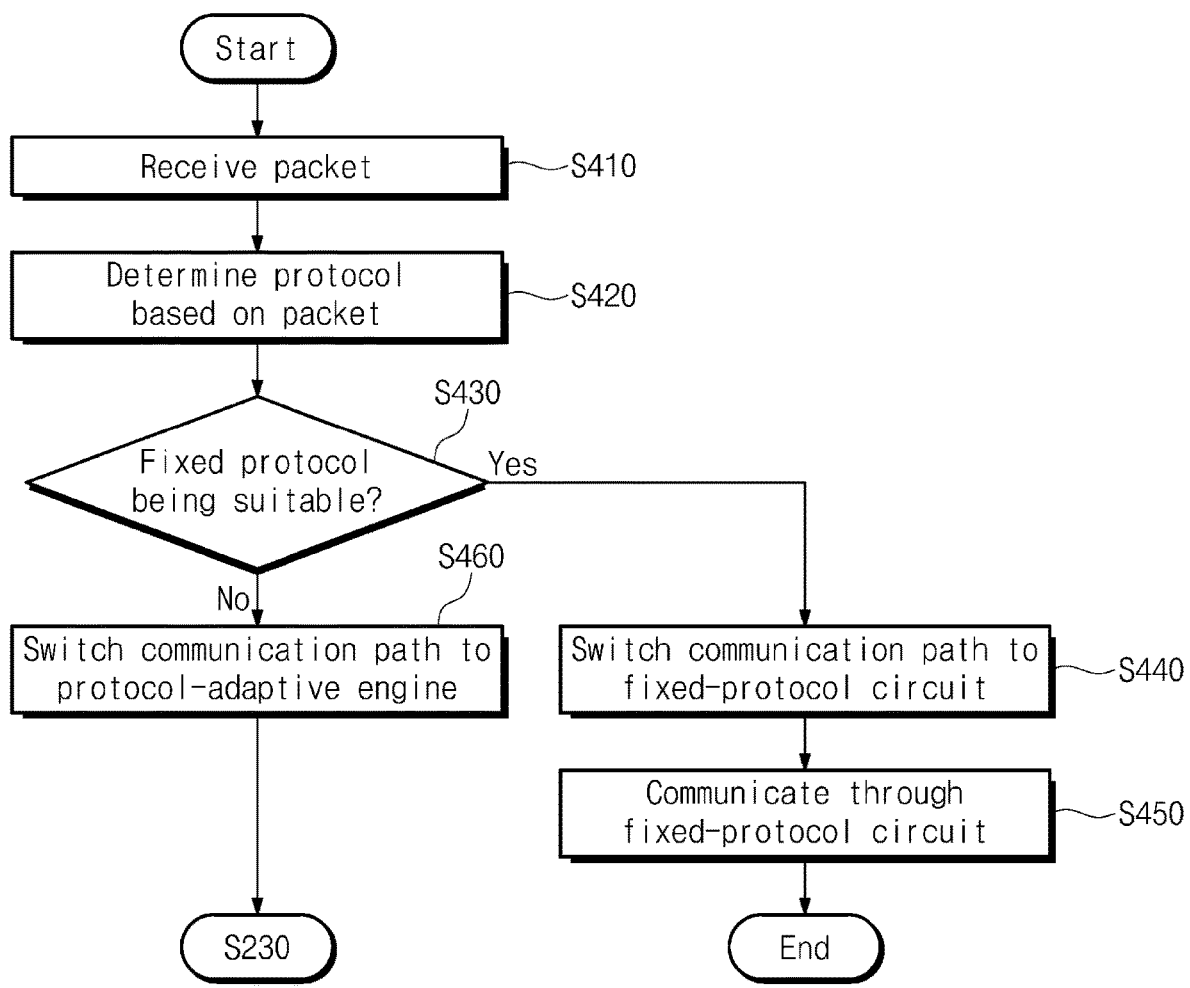
FIG. 21 is a flowchart describing an example operation of a controller of FIG. 19.

FIG. 21 is a flowchart describing an example operation of the controller 4300 of FIG. 19.

The protocol manager 4321 may receive a packet from the host interface circuit 4310 (S410) and may determine a protocol based on the received packet (S420).

When the determined protocol is supported by the fixed-protocol circuit 4350 (Yes of S430), the protocol manager 4321 may control the switches 4313 and 4393 such that the path through the fixed-protocol circuit 4350 is selected (S440). Accordingly, the fixed-protocol circuit 4350 may process a request of the host 100 in compliance with the selected protocol (S450).

In response to the determination that the determined protocol is not supported by the fixed-protocol circuit 4350 (No of S430), the protocol manager 4321 may control the switches 4313 and 4393 such that the path through the protocol-adaptive engine 4320 is selected (S460). Afterwards, an operation of the controller 4300 may proceed to operation S230 of FIG. 6. Accordingly, the protocol manager 4321 may control the programming of the programmable logic device 4322 such that the programmable logic device 4322 is programmed to a state for supporting the determined protocol.

Figure 22:
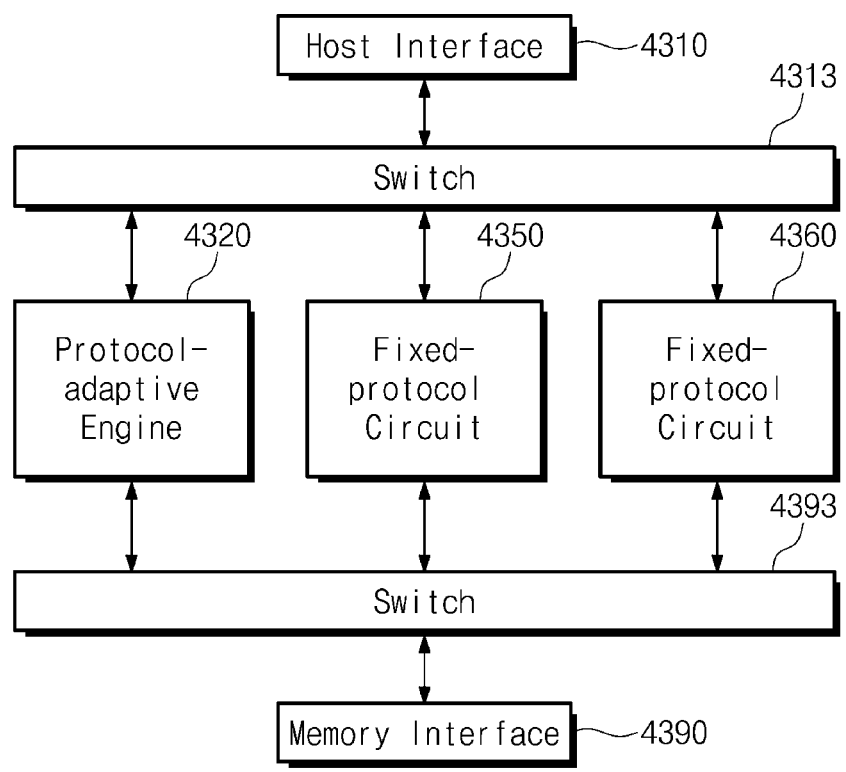
FIG. 22 is a block diagram illustrating an example configuration associated with a controller of FIG. 19.

FIG. 22 is a block diagram illustrating an example configuration associated with the controller 4300 of FIG. 19. In some example embodiments, the controller 4300 of FIG. 19 may include a controller 4300b of FIG. 22.

For example, the controller 4300b may include a fixed-protocol circuit 4360. The fixed-protocol circuit 4360 may perform logical operations for supporting one or more fixed protocols. A protocol which is supported by the fixed-protocol circuit 4360 may be identical to or different from a protocol which is supported by the fixed-protocol circuit 4350.

The number of fixed-protocol circuits included in the controller 4300b may be variously changed or modified. The protocol-adaptive engine 4320 may support a plurality of protocols different from a protocol(s) which is(are) supported by the fixed-protocol circuits 4350 and 4360.

The controller 4300b may operate in compliance with various protocols concurrently and may support more fixed protocols. In some cases, the controller 4300b may be more advantageous when the storage device 4000 is configured to communicate through a multi-port (e.g., a dual-port).

Figure 23:
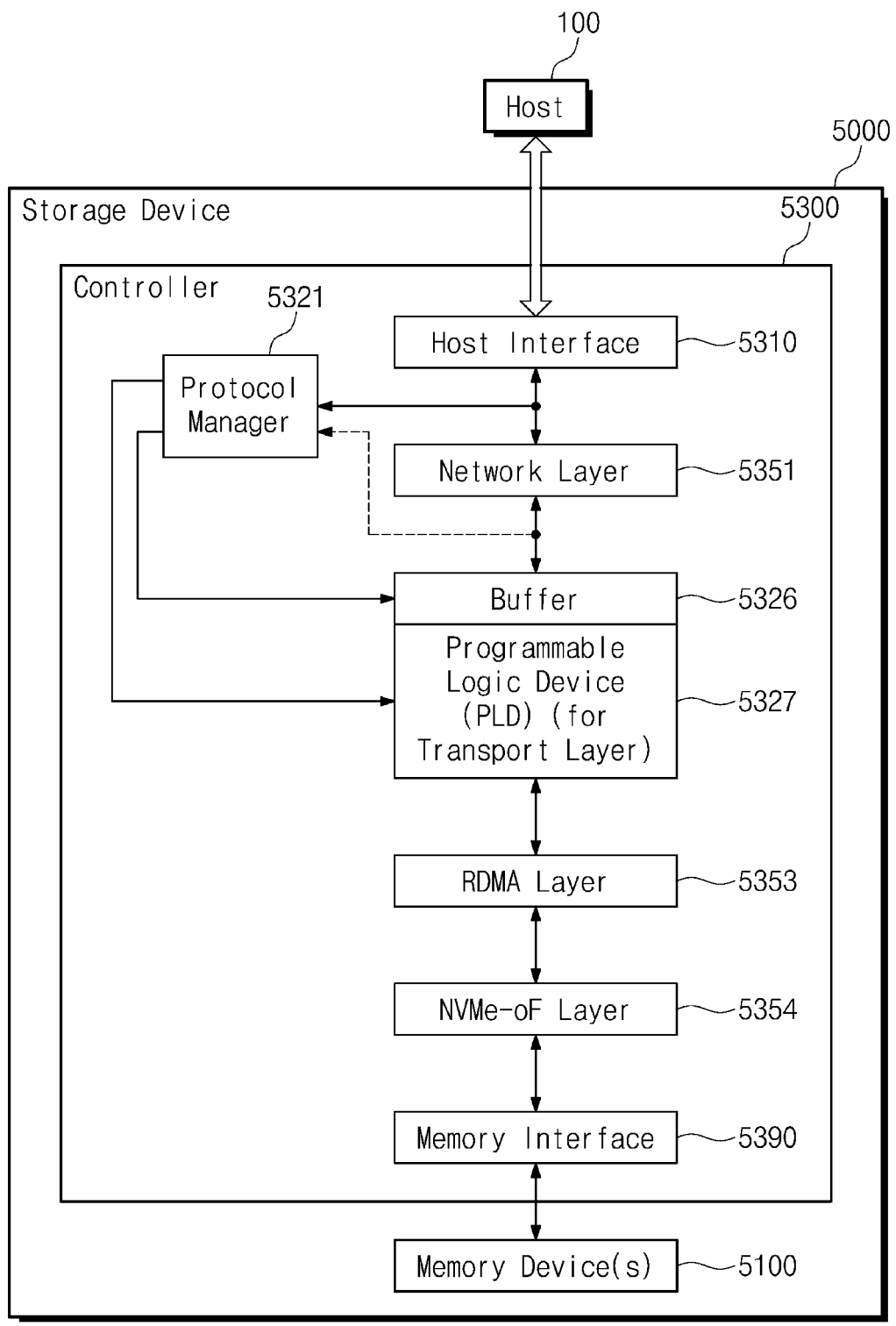
FIG. 23 is a block diagram illustrating an example configuration associated with a storage device of FIG. 1 or 2.

FIG. 23 is a block diagram illustrating an example configuration associated with the storage device 1300 or 2300 of FIG. 1 or 2. In some example embodiments, the storage device 1300 or 2300 of FIG. 1 or 2 may include a storage device 5000 of FIG. 23.

The storage device 5000 may include at least one memory device 5100 and a controller 5300. The controller 5300 may include a host interface circuit 5310, a protocol manager 5321, a buffer 5326, a programmable logic device 5327, and a memory interface circuit 5390, and the example embodiments described with reference to FIGS. 3 to 22 may also be applied thereto.

The controller 5300 may support a protocol which is processed depending on an operation of a plurality of layers. For example, the controller 5300 may include a network layer 5351, a transport layer, an RDMA layer 5353, and an NVMe-oF layer 5354 to support an Ethernet protocol. The Ethernet protocol and layers thereof are an example for facilitating better understanding and are not intended to limit the present disclosure. A protocol which is supported by the controller 5300 may be variously changed or modified.

The network layer 5351, the RDMA layer 5353, and the NVMe-oF layer 5354 may include a hardware circuit (e.g., a logic circuit) configured to perform logical operations. The layers 5351, 5353, and 5354 may be understood as fixed protocol circuits for supporting an operation of a respective layer of the Ethernet protocol.

Meanwhile, the transport layer may be implemented in the programmable logic device 5327. The protocol manager 5321 may determine a protocol based on an output of the host interface circuit 5310 (in some cases, an output of the network layer 5351), and may control the buffer 5326 and the programmable logic device 5327 based on the determined protocol.

For example, the programmable logic device 5327 may be reconfigurable to perform an operation of the determined protocol among protocols of the transport layer such as transmission control protocol (TCP), user datagram protocol (UDP), and/or the like. The buffer 5326 may buffer a packet while reconfiguration of the programmable logic device 5327 is performed.

Figure 24:
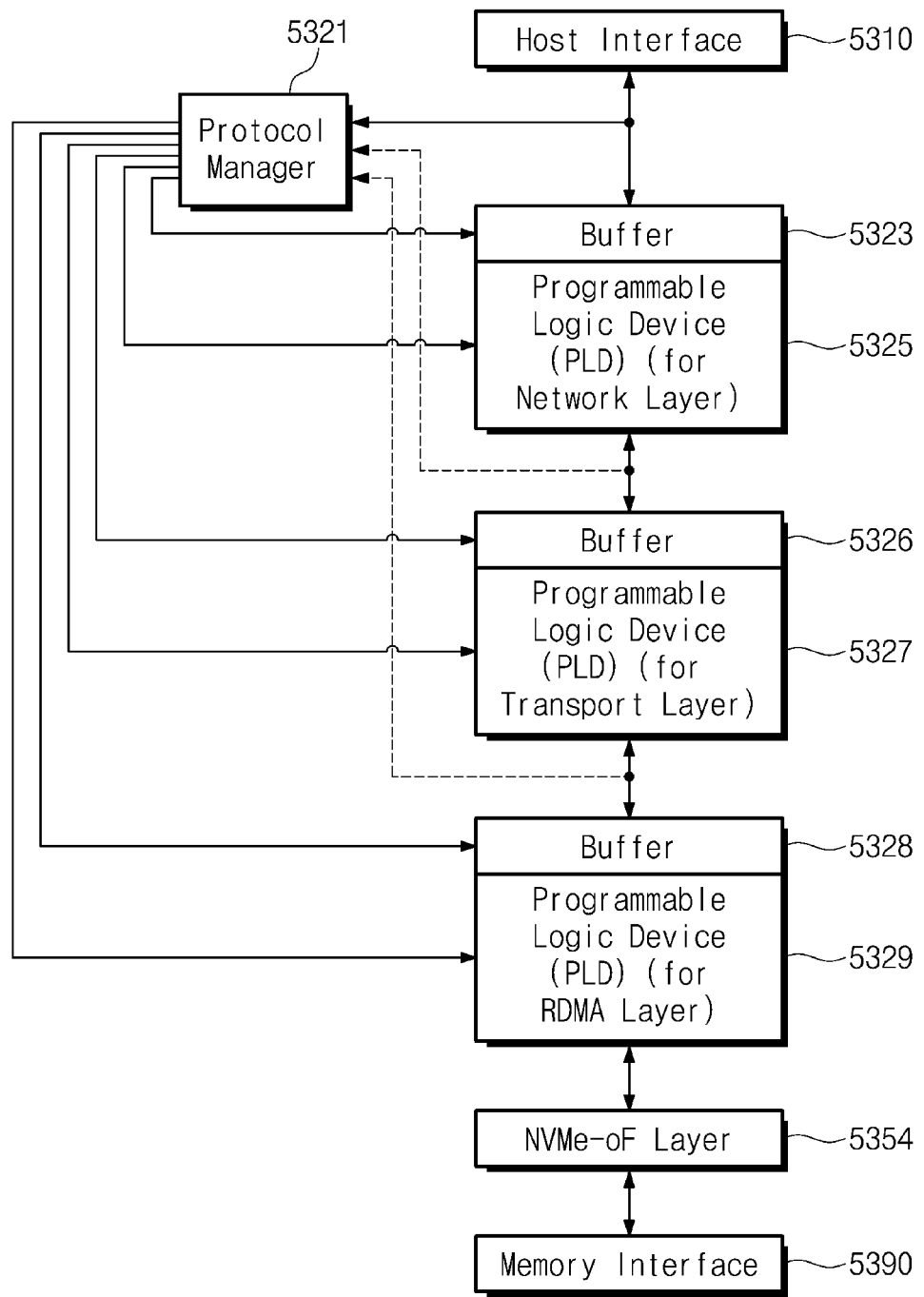
FIG. 24 is a block diagram illustrating an example configuration associated with a controller of FIG. 23.

FIG. 24 is a block diagram illustrating an example configuration associated with the controller 5300 of FIG. 23. In some example embodiments, the controller 5300 of FIG. 23 may include a controller 5300a of FIG. 24.

In the controller 5300a, a network layer may be implemented in a buffer 5323 and a programmable logic device 5325 and an RDMA layer may be implemented in a buffer 5328 and a programmable logic device 5329. The protocol manager 5321 may control each layer based on a protocol determined with regard to a request of the host 100.

For example, the programmable logic device 5325 may be reconfigurable to perform an operation of the determined protocol among protocols of the network layer such as Internet protocol (IP), routing information protocol (RIP), and/or the like. For example, the programmable logic device 5329 may be reconfigurable to perform an operation of the determined protocol among protocols of the RDMA layer such as RDMA over converged Ethernet (RoCE), Internet wide-area RDMA protocol (iWARP), and/or the like. The buffers 5323 and 5328 may buffer packets while reconfiguration of the programmable logic devices 5325 and 5329 is performed.

The present disclosure is not limited to the example configurations of FIGS. 23 and 24. A type of a layer implemented in a programmable logic device and the number of layers implemented in programmable logic devices may be variously changed or modified.

Figure 25:
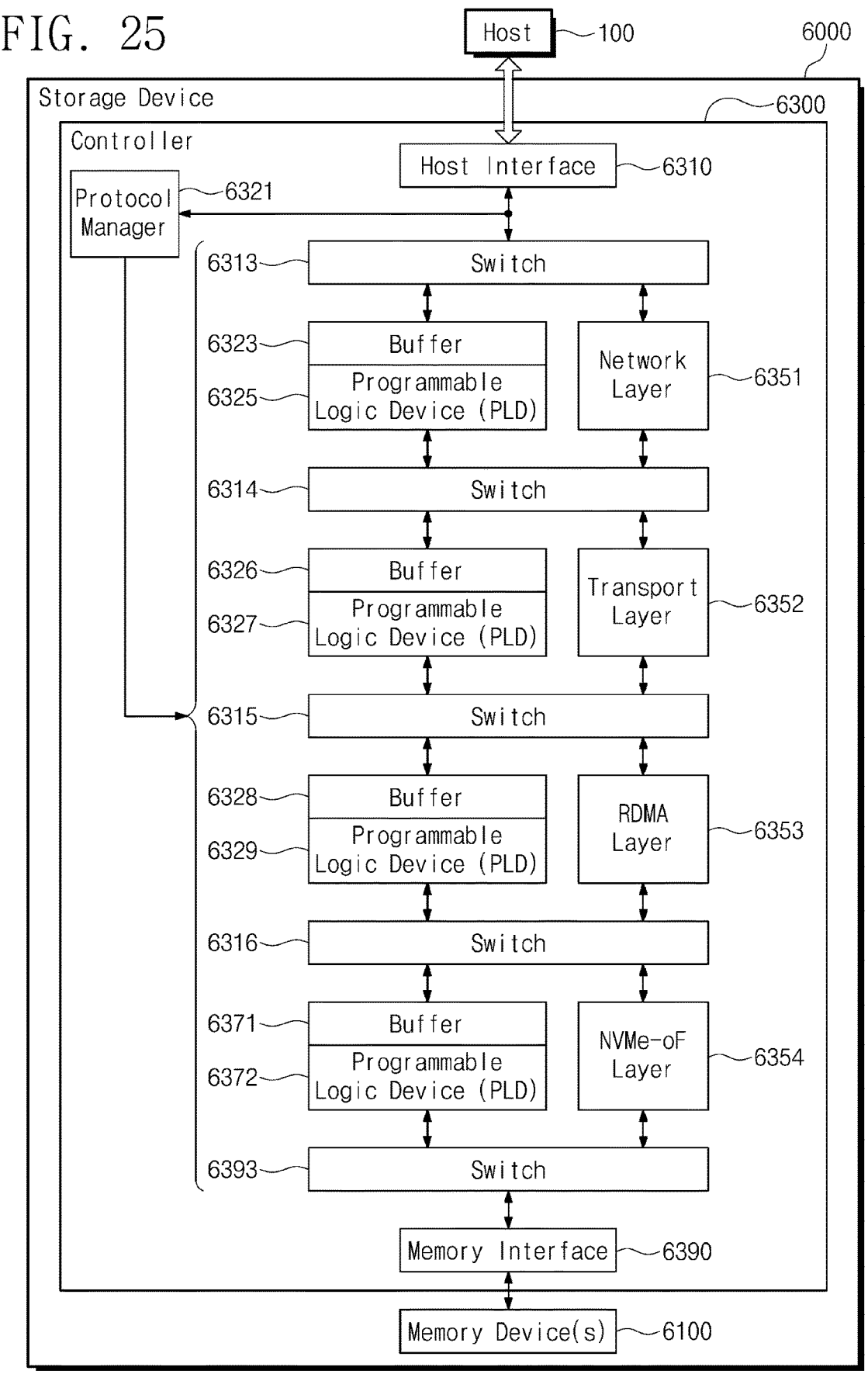
FIG. 25 is a block diagram illustrating an example configuration associated with a storage device of in FIG. 1 or 2.

FIG. 25 is a block diagram illustrating an example configuration associated with the storage device 1300 or 2300 of FIG. 1 or 2. The storage device 1300 or 2300 of FIG. 1 or 2 may include a storage device 6000 of FIG. 25.

The storage device 6000 may include one or more memory devices 6100 and a controller 6300. The controller 6300 may include a network layer 6351, a transport layer 6352, an RDMA layer 6353, and an NVMe-oF layer 6354.

The layers 6351, 6352, 6353, and 6354 may be understood as fixed-protocol circuits for supporting at least one fixed (or selected) protocol (e.g., an Ethernet protocol) when a request of the host 100 is received with regard to the fixed protocol. The layers 6351, 6352, 6353, and 6354 may include a hardware circuit (e.g., a logic circuit) configured to perform operations of the respective layers of the Ethernet protocol.

The controller 6300 may include a host interface circuit 6310, a protocol manager 6321, buffers 6323, 6326, 6328, and 6371, programmable logic devices 6325, 6327, 6329, and 6372, switch circuits 6313, 6314, 6315, 6316, and 6393, and a memory interface circuit 6390, and the example embodiments described with reference to FIGS. 3 to 24 may also be applied thereto.

The programmable logic devices 6325, 6327, 6329, and 6372 may be reconfigurable and may be programmed to one of one or more states for supporting one or more protocols depending on a request of the host 100 received with regard to the one or more protocols different from a protocol supported by fixed-protocol circuits. The buffers 6323, 6326, 6328, and 6371 may buffer packets while reconfiguration of the programmable logic devices 6325, 6327, 6329, and 6372 is performed.

In some example embodiments, the programmable logic devices 6325, 6327, 6329, and 6372 may be provided corresponding to respective layers of a protocol supported by the fixed-protocol circuits. For example, the programmable logic devices 6325, 6327, 6329, and 6372 may be reconfigured to perform operations respectively corresponding to the layers 6351, 6352, 6353, and 6354.

The buffers 6323, 6326, 6328, and 6371 may buffer packets while the reconfiguration of the programmable logic devices 6325, 6327, 6329, and 6372 is performed. The buffers 6323, 6326, 6328, and 6371 may not buffer a packet which is obtained from a request of the host 100 processed by the layers 6351, 6352, 6353, and 6354.

The switch circuits 6313, 6314, 6315, 6316, and 6393 may selectively provide a path through the programmable logic devices 6325, 6327, 6329, and 6372 or a path through fixed-protocol circuits of the layers 6351, 6352, 6353, and 6354 depending on a protocol to be supported in the controller 6300. For example, when a fixed-protocol circuit of the network layer 6351 is required with regard to a network layer and the programmable logic device 6327 is required with regard to a transport layer, the switches 6313 and 6314 may provide a path through the fixed-protocol circuit of the network layer 6351, and the switches 6314 and 6315 may provide a path through the programmable logic device 6327.

The protocol manager 6321 may control components of the controller 6300 and paths through the switches 6313, 6314, 6315, 6316, and 6393 based on the request of the host 100.

Figure 26:
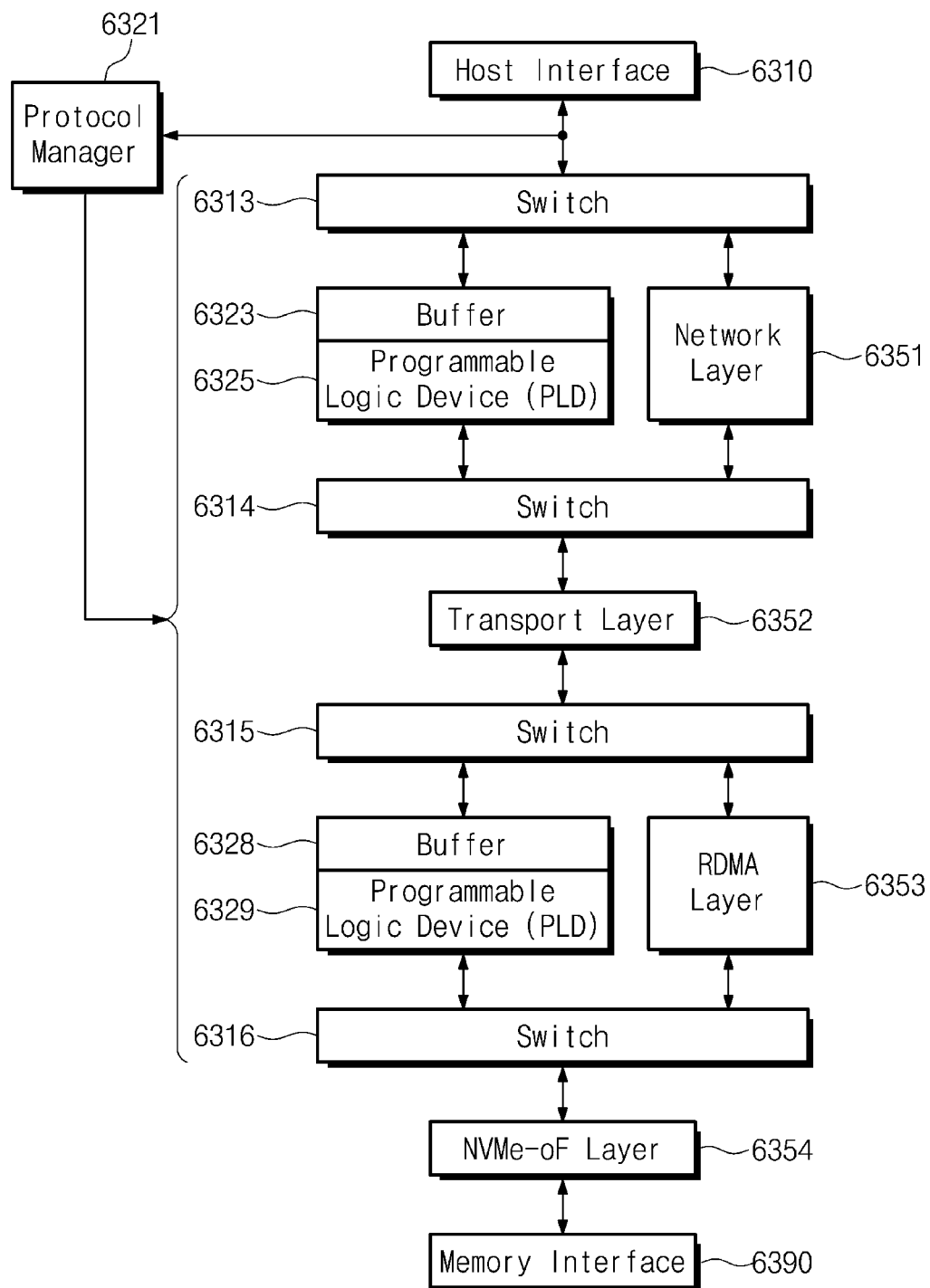
FIG. 26 is a block diagram illustrating an example configuration associated with a controller of FIG. 25.

FIG. 26 is a block diagram illustrating an example configuration associated with the controller 6300 of FIG. 25. In some example embodiments, the controller 6300 of FIG. 25 may include a controller 6300a of FIG. 26.

In the controller 6300a, the transport layer 6352 and the NVMe-oF layer 6454 may be implemented with fixed-protocol circuits without a programmable logic device. The present disclosure is not limited to the example configurations of FIGS. 25 and 26. Each layer of a protocol may be variously changed or modified to be implemented with a fixed-protocol circuit without a programmable logic device or use both a programmable logic device and a fixed-protocol circuit.

Figure 27:
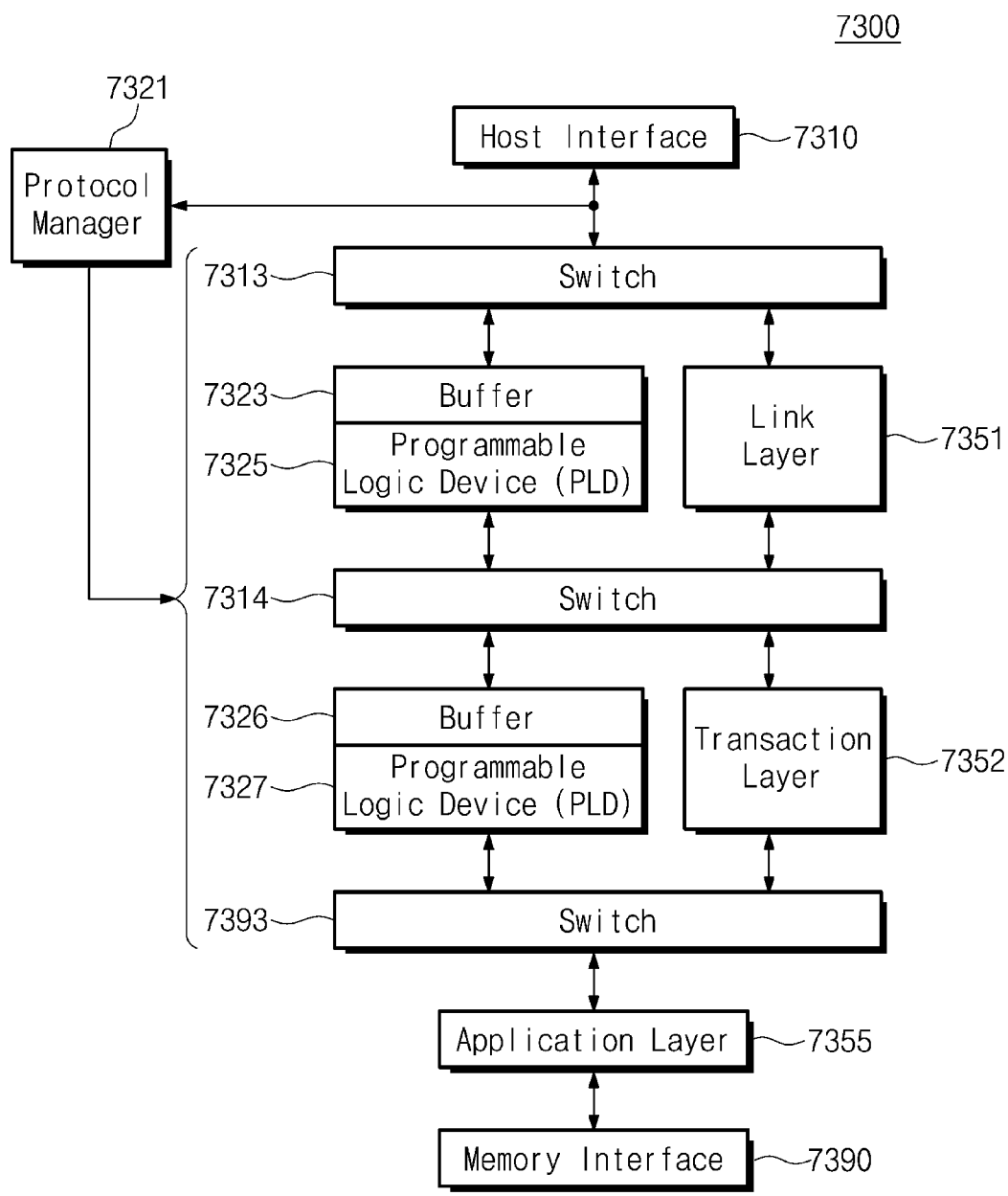
FIGS. 27 and 28 are block diagrams illustrating an example configuration associated with a controller of FIG. 1 or 2.
Figure 28:
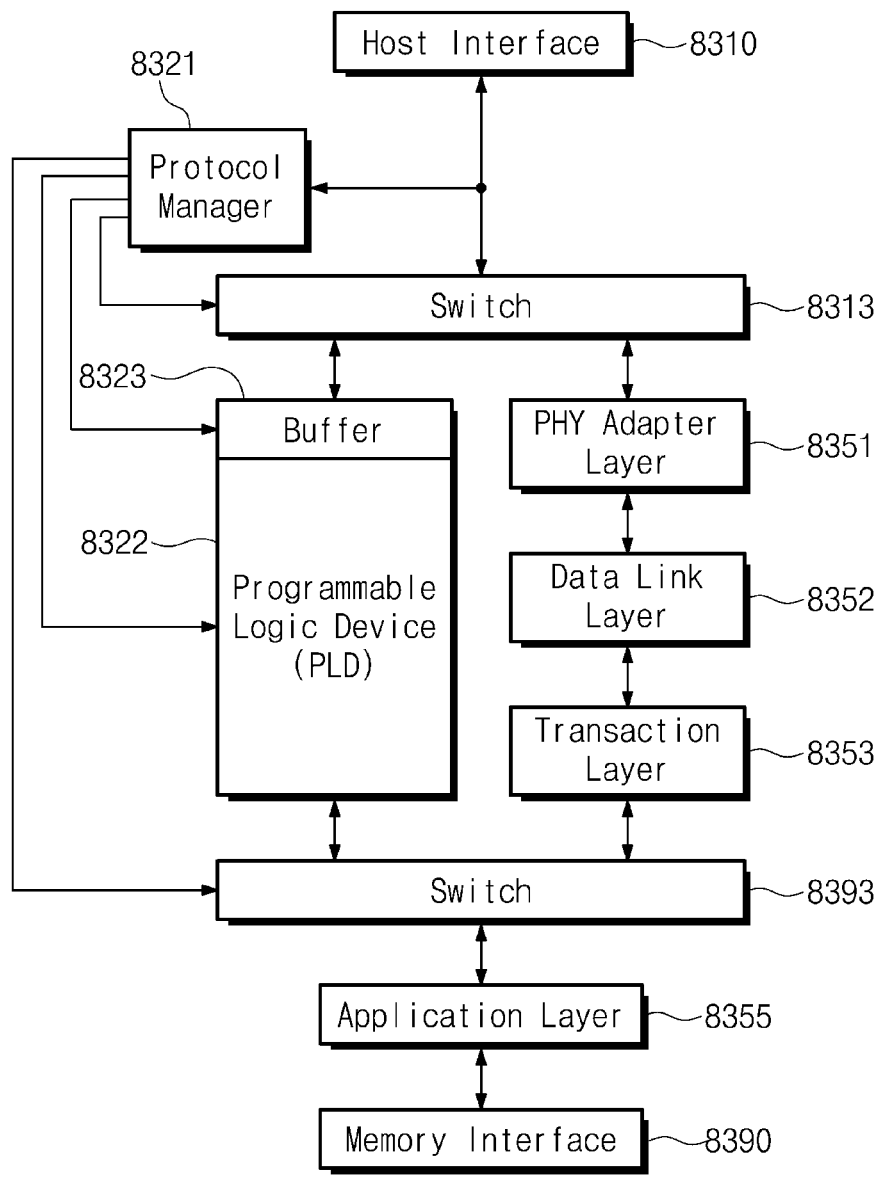

FIGS. 27 and 28 are block diagrams illustrating an example configuration associated with the controller 1330 or 2330 of FIG. 1 or 2.

Some example embodiments have been described with regard to the Ethernet protocol, but the present disclosure is not limited thereto. The example embodiments may also be applied to various protocols other than the Ethernet protocol.

For example, the controller 1330 or 2330 of FIG. 1 or 2 may include a controller 7300 of FIG. 27. Referring to FIG. 27, the controller 7300 may include fixed-protocol circuits of a link layer 7351, a transaction layer 7352, and an application layer 7355 to support an SAS or a PCIe protocol. The controller 7300 may include a host interface circuit 7310, a protocol manager 7321, buffers 7323 and 7326, programmable logic devices 7325 and 7327, switch circuits 7313, 7314, and 7393, and a memory interface circuit 7390, and the example embodiments described with reference to FIGS. 3 to 26 may also be applied thereto.

For example, the controller 1330 or 2330 of FIG. 1 or 2 may include a controller 8300 of FIG. 28. Referring to FIG. 28, the controller 8300 may include fixed-protocol circuits of a PHY adapter layer 8351, a data link layer 8352, a transaction layer 8353, and an application layer 8355. The controller 8300 may include a host interface circuit 8310, a protocol manager 8321, a programmable logic device 8322, a buffer 8323, switch circuits 8313 and 8393, and a memory interface circuit 8390, and the example embodiments described with reference to FIGS. 3 to 26 may also be applied thereto.

Besides, various other protocols may be supported with regard to the example embodiments. In addition, the example embodiments may also be applied to various devices other than a storage device. For example, the main processor 1101 or the working memory 1200 may include programmable logic devices which are capable of adaptively supporting a plurality of protocols to flexibly process a request received from the outside.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The above descriptions are intended to provide example configurations and operations for implementing the present disclosure. The present disclosure may include implementations which may be obtained by simply changing or modifying the above example embodiments, in addition to the above-described example embodiments. Also, the present disclosure may include implementations which may be accomplished by easily changing or modifying the above-described example embodiments in the future.

What is claimed is:

1. A storage device comprising:
a nonvolatile memory device; and
a controller configured to receive packets from an external host of the storage device and process the packets to control the nonvolatile memory device,
wherein the controller comprises:
a protocol manager configured to determine, based upon information within at least one packet, at least one protocol that corresponds to at least one request, respectively, included within the at least one packet,
a fixed-protocol circuit configured to process a first packet of the packets, the first packet including a first request, the first request corresponding to a first protocol determined by the protocol manager, and
a programmable logic device configured to process a second packet and a third packet of the packets, the second packet including a second request corresponding to a second protocol, and the third packet including a third request corresponding to a third protocol,
wherein the first protocol, the second protocol, and the third protocol are different from each other, and
wherein the programmable logic device is programmed between:
a first state, based on first configuration data, for implementing the second protocol, which is indicated by a first protocol information field in a header of the second packet, to process the second request within the second packet based on the second protocol; and
a second state, based on second configuration data, for implementing the third protocol, which is indicated by a second protocol information field in a header of the third packet, to process the third request within the third packet based on the third protocol.

2. The storage device of claim 1, wherein the controller further comprises a first switch circuit configured to provide a packet of the packets to one of the fixed-protocol circuit and the programmable logic device.

3. The storage device of claim 1, wherein when the protocol is the first protocol, the protocol manager is further configured to control a first switch circuit such that the first packet is provided to the fixed-protocol circuit.

4. The storage device of claim 1, wherein the protocol manager is further configured to control a first switch circuit such that the corresponding packet is provided to the programmable logic device when the protocol is not the first protocol.

5. The storage device of claim 4, wherein when the protocol is the third protocol and the programmable logic device is programmed to the first state, the protocol manager is further configured to reprogram the programmable logic device to the second state and then provide the second request of the third packet to the programmable logic device.

6. The storage device of claim 5, wherein the controller further comprises a buffer configured to buffer the packet, while the programmable logic device is reprogrammed from the first state to the second state.

7. The storage device of claim 1, wherein the first configuration data and the second configuration data are stored in the nonvolatile memory device.

8. The storage device of claim 1, wherein the controller further comprises a memory interface circuit configured to exchange data with the nonvolatile memory device based on the packets processed by the fixed-protocol circuit or the programmable logic device.

9. The storage device of claim 1, wherein the controller further comprises a host interface circuit configured to receive the packets from the external host through a network.

10. A storage device comprising:
a nonvolatile memory device; and
a controller including a fixed-protocol circuit, a protocol manager, and a programmable logic device,
wherein the protocol manager is configured to determine, based upon information within a plurality of packets that is received from an external host of the storage device, at least one protocol of a plurality of protocols that corresponds to at least one request, respectively, included within each packet of the plurality of packets,
wherein the fixed-protocol circuit is configured to implement a first protocol of the plurality of protocols such that the nonvolatile memory device stores or outputs data corresponding to a first packet of the plurality of packets that is received from the external host of the storage device, the first packet corresponding to the first protocol,
wherein the programmable logic device is reconfigurable, based on the plurality of packets that are received from the external host, to adaptively implement the plurality of protocols such that the nonvolatile memory device stores or outputs data corresponding to the plurality of packets,
wherein, when a second packet of the plurality of packets corresponding to a second protocol of the plurality of protocols is received from the external host, the programmable logic device is programmed, based on first configuration data, to a first state for implementing the second protocol, which is indicated by a first protocol information field in a header of the second packet, to process a first request within the second packet based on the second protocol such that the nonvolatile memory device stores or outputs data corresponding to the second packet,
wherein, when a third packet of the plurality of packets corresponding to a third protocol of the plurality of protocols is received from the external host, the programmable logic device is programmed, based on second configuration data, to a second state for implementing the third protocol, which is indicated by a second protocol information field in a header of the third packet, to process a second request within the third packet based on the third protocol such that the nonvolatile memory device stores or outputs data corresponding to the third packet, and
wherein the first protocol, the second protocol, and the third protocol are different from each other.

11. The storage device of claim 10, wherein the protocol manager is configured to control programming of the programmable logic device such that the programmable logic device is programmed to the first state in response to determination that the second protocol is not implemented by the fixed-protocol circuit.

12. The storage device of claim 10, wherein the protocol manager is configured to:
identify the third protocol corresponding to the third packet received from the external host, and
output a control signal such that the second configuration data for programming the programmable logic device to the second state for implementing the third protocol is output from the nonvolatile memory device or is received from the external host.

13. The storage device of claim 10, wherein the controller further comprises a host interface circuit configured to receive the packets from the external host through a network.

14. A storage device comprising:
a protocol manager configured to determine, based upon information within a plurality of packets, at least one protocol from a plurality of protocols that corresponds to a request included within each of the plurality of packets,
a first fixed-protocol circuit that implements a first protocol of the plurality of protocols in response to receiving a first request identifying the first protocol;
a first programmable logic device that is reprogrammed from a first state to a second state for implementing a second protocol of the plurality of protocols, which is different from the first protocol and is indicated by a first protocol information field in a header of one packet of the plurality of packets, in response to receiving a second request for the second protocol;
a first switch circuit configured to selectively provide a first path or a second path based on the first request and the second request, the first path being through the first fixed-protocol circuit and the second path being through the first programmable logic device;
a second fixed-protocol circuit configured to implement an operation of the first protocol;
a second programmable logic device configured to implement the operation of the second protocol; and
a second switch circuit configured to selectively provide a third path or a fourth path based on the first request and the second request, the third path being through the second fixed-protocol circuit and the fourth path being through the second programmable logic device,
wherein:
in response to receiving the second request, the first switch circuit is configured to provide the second path, and the first fixed-protocol circuit performs the operation of the first protocol and
the first programmable logic device is configured to perform the operation of the second protocol.

15. The storage device of claim 14, further comprising:
a buffer configured to buffer a packet obtained from the second request without outputting the packet, while reconfiguration from the first state to the second state is performed, wherein the buffer does not buffer a packet obtained from the first request.

16. The storage device of claim 15, wherein in response to the reconfiguration from the first state to the second state being completed:
   the buffer is configured to output the buffered packet, and
   the first programmable logic device is configured to perform synchronization with a timing of processing the buffered packet and processes the buffered packet based on a synchronized timing.

\* \* \* \* \*